(12) United States Patent
Pierzga et al.

(10) Patent No.: US 7,100,187 B2
(45) Date of Patent: Aug. 29, 2006

(54) METHOD AND SYSTEM FOR PROVIDING AN AUDIO/VIDEO IN-ROUTE ENTERTAINMENT SYSTEM

(75) Inventors: Wayne Pierzga, Severna Park, MD (US); Carl A. Herbst, Arlington, VA (US)

(73) Assignee: AIRIA Ltd., Annapolis, MD (US)

( * ) Notice: Subject to any disclaimer, the term of this patent is extended or adjusted under 35 U.S.C. 154(b) by 725 days.

(21) Appl. No.: 10/235,538

(22) Filed: Sep. 6, 2002

(65) Prior Publication Data

US 2003/0084451 A1  May 1, 2003

Related U.S. Application Data

(60) Provisional application No. 60/317,120, filed on Sep. 6, 2001.

(51) Int. Cl.
H04N 5/445 (2006.01)
H04N 7/18 (2006.01)

(52) U.S. Cl. ............... 725/76; 725/47; 725/75; 725/87; 725/97

(58) Field of Classification Search ........ 725/24, 725/47, 133, 134, 141, 153; 455/509, 517; 715/721, 747
See application file for complete search history.

(56) References Cited

U.S. PATENT DOCUMENTS

| 5,508,731 | A | * | 4/1996 | Kohorn ............... 725/24 |
| 5,790,198 | A | | 8/1998 | Roop et al. |
| 5,801,751 | A | | 9/1998 | Sklar et al. |
| 5,945,988 | A | * | 8/1999 | Williams et al. ........ 715/747 |
| 5,966,442 | A | | 10/1999 | Sachdev |
| 5,977,964 | A | * | 11/1999 | Williams et al. ........ 715/721 |
| 5,990,928 | A | | 11/1999 | Sklar et al. |
| 2002/0152470 | A1 | | 10/2002 | Hammond |
| 2003/0153338 | A1 | * | 8/2003 | Herz et al. ............. 455/517 |

* cited by examiner

*Primary Examiner*—Kieu-Oanh Bui
(74) *Attorney, Agent, or Firm*—Birch, Stewart, Kolasch & Birch, LLP

(57) ABSTRACT

An apparatus and a method generate customized content for in-route entertainment on a mobile element, such as an aircraft. In one embodiment, the apparatus includes a shared program input for receiving a shared program stream, which includes primary entertainment content (e.g., video segments) intended for a plurality of mobile elements; a supplemental content input for receiving customized supplemental content, such as advertising and branding segments; a scheduler providing scheduling information, which indicates insertion points in the shared program stream for customized supplemental input as a function of characteristics of the mobile element; and an output for outputting the shared program stream, the customized supplemental content, and the scheduling information for subsequent generation of an entertainment content stream customized for the mobile element.

18 Claims, 20 Drawing Sheets

METHOD AND SYSTEM FOR PROVIDING AN AUDIO/VIDEO IN-ROUTE ENTERTAINMENT SYSTEM

This application claims priority on provisional Application No. 60/317,120 tiled on Sep. 6, 2001, the entire contents of which are hereby incorporated by reference.

FIELD OF THE INVENTION

The present invention relates to the field of audio and video in-route entertainment (IRE) systems. More particularly, the present invention relates to the field of distributed audio and/or video broadcasts with customized audio and/or video segments inserted therein.

BACKGROUND OF THE INVENTION

The majority of existing commercial IRE systems, which include in-flight entertainment (IFE) systems, display movies and short subjects that are distributed on physical media such as videotape and DVD disks. The programming is typically displayed on community television screens.

Some airlines have recently upgraded their IRE infrastructure to permit passengers to select what they want to watch from multiple channels via personal viewing via seat back television screens. Even more recent IRE upgrades allow limited individual passenger control to start, stop and rewind the programs that they watch. A few airlines have fielded a system that permits passengers to view live television broadcasting provided by domestic commercial satellite television companies.

Existing direct-to-aircraft satellite television systems (DTA IRE) suffer from at least four limitations. The first limitation is that the service coverage area provided by current DTA IRE systems are geographically bound by the existing domestic direct-to-home (DTH) satellite television carriers. Consequently, as an aircraft traverses its fight path, it can move outside the coverage area provided by the DTH system (the same is true for non-aircraft, and especially true for oceanic travel). Secondly, existing DTA IRE systems must comply with the technical requirements of the DTH system with which they work. The technical characteristics of DTH systems vary considerably throughout the world. Equipment that works with one DTH system will generally not work with another. A third limitation is the inability of current systems to permit individual airlines control over the content and presentation of programming that is shown to their passengers. With DTH-based DTA IRE, the programming presented to all passengers tuned to the same channel on all aircraft is the same. Consequently, a passenger on one airline may be presented with advertisements for a rival airline.

A fourth limitation is that current systems do not provide customized, schedule-adjustable video segments (such as advertisements) within a broadcast. Presently, advertisements and promotions displayed on IRE or IFE systems rely on fixed scheduling, whether the spots are embedded within pre-recorded media or appear within live broadcasts. The advertisements shown in live broadcasts currently are limited to those contracted with the content provider and are shown to all passengers who elect to watch the channel. Airlines cannot tailor the inserts for content control such as competitor screen-outs or subject matter filtering. As such, with present live broadcasting unregulated inserts can cause undesired challenges in regard to both competitive marketing and cabin control.

SUMMARY OF THE INVENTION

The present invention provides solutions that address at least the four above-identified limitations that affect the existing DTA IRE or IFE systems, or more generally, direct-to-mobile (DTM) IRE systems.

The present invention makes use of a constellation of geosynchronous satellites that together provide near global service coverage. The present invention employs the antennas that are already fitted to nearly 76 percent of modern long-haul wide-bodied aircraft in use worldwide. The present invention is inserted between this existing antenna and any existing IRE or IFE audio-video distribution system whether community screen based or personal screen based.

The present invention addresses the stated limitations with conventional DTM systems by implementing a customized program segment insert methodology. In one aspect, the methodology includes inserting customized play lengths or segments (such as advertising segments) into a content stream (i.e., video and audio data stream) received from a content provider. In another aspect, the methodology includes removing pre-formatted advertising insert slots contained in the received content stream for replacement by customized insert play lengths while maintaining the originally scheduled broadcast place markers. A further aspect provides for creating gaps in the received content stream in order to locally insert customized play lengths or segments.

A scheduler uses buffering to achieve continuity in the play of the broadcast interspersed with the inserts. The present invention takes into account the ground, onboard, and broadcast schedules to accomplish pre-flight optimistic scheduling as well as in-flight rescheduling which takes into consideration broadcast changes, flight schedule changes and avionics data.

The present invention adds live television programming and other information content to existing IRE systems and other mobile platforms via a single system that substantially works throughout the world, covering about 97% of the earth's surface area. Two or more channels of live television content (such as news or sports) can be processed at a Network Operations Center (NOC), distributed to ground earth stations and relayed via geosynchronous satellites (in one exemplary embodiment) to subscribing aircraft and other mobile platforms.

The on-board components include equipment that can be broadly partitioned into radio reception functions and audio-video and data processing functions. These two broad categories of functionality are installed into a Radio Frequency Unit (RFU) and a Multimedia Unit (MMU) respectively in one exemplary embodiment of the system. On aircraft, the broadcast signals will be received by a directional antenna whose position is controlled by other onboard systems not affiliated with the present invention and sent to the RFU for demodulation via a passive coupling device. The RFU contains receiver demodulator(s) that extract a data stream from an over-the-air satellite downlink carrier and send it to the MMU. The RFU sends the demodulated bit streams that contain the live television and information content to the MMU for demultiplexing, video-audio decompression, and processing. The MMU outputs the recovered video and audio content in standard formats to the aircraft's existing IRE system for passenger viewing.

The MMU demultiplexes and processes the recovered data streams, decompresses the video and audio content, "splices" the live video and audio content with locally cached material as needed, and outputs the combined program to the existing aircraft IRE system. Each MMU also extracts from the demultiplexed data streams data addressed to it, which is then saved for later use. Received data is stored in the MMU's hard disk.

Advertising content and special video segments may be sent along with the live video, stored in the MMU, and then shown as required giving the programming a customized appearance. The on-board components of the present invention monitor their own functions and performance and periodically report their status and configuration data to the NOC center via an INMARSAT Aero system in one exemplary embodiment of the system. Based on the information received, the present invention adapts its transmission schedule and information sent to mobile platforms to most efficiently use available communication channel capacity.

TERMS AND ABBREVIATIONS

The following abbreviations and terms will be used throughout this description, and brief definitions are provided for convenience:

IRE In-Route Entertainment System—an entertainment system used by passengers during a journey such as an aircraft flight, or sea cruise.

IFE In-Flight Entertainment System—an entertainment system used by aircraft flight passengers.

DTA-IRE Direct-to-air-IRE—an entertainment system provided to aircraft flight passengers through a communications link from a ground station.

DTH Direct to Home—an entertainment system that provides satellite connectivity through a home satellite antenna and receiver.

DTM Direct to Mobile—communications connectivity provided to a mobile client system such as an aircraft or cruise ship.

NOC Network Operations Center—a ground-based facility that controls content and communications to IREs.

RFU Radio Frequency Unit—the on-board device that houses the radio reception function of an IRE.

MMU Multi-media Unit—the on-board device that houses the audio-video and data processing functions of an IRE.

SDU Satellite Distribution Unit—the on-board device that houses the satellite data link used by the aircraft avionics.

WAN Wide Area Network—a commercially available computer communications system used to provide connectivity between separate computer networks.

RF Radio Frequency—used to indicate the specific point on the radio spectrum that a signal emanates from, or energy emanating from a radio broadcast device.

MPEG-4 Motion Picture Expert Group—a standard used to compress video.

NTSC National Television System Committee—a television signal standard used by the United States and other countries.

NATS North American Telephone System—self-explanatory.

ISDN Integrated Services Digital Network—a multi-media digital service provided over twisted pair telephone lines.

DETAILED DESCRIPTION OF THE PREFERRED EMBODIMENTS

Figure 1:
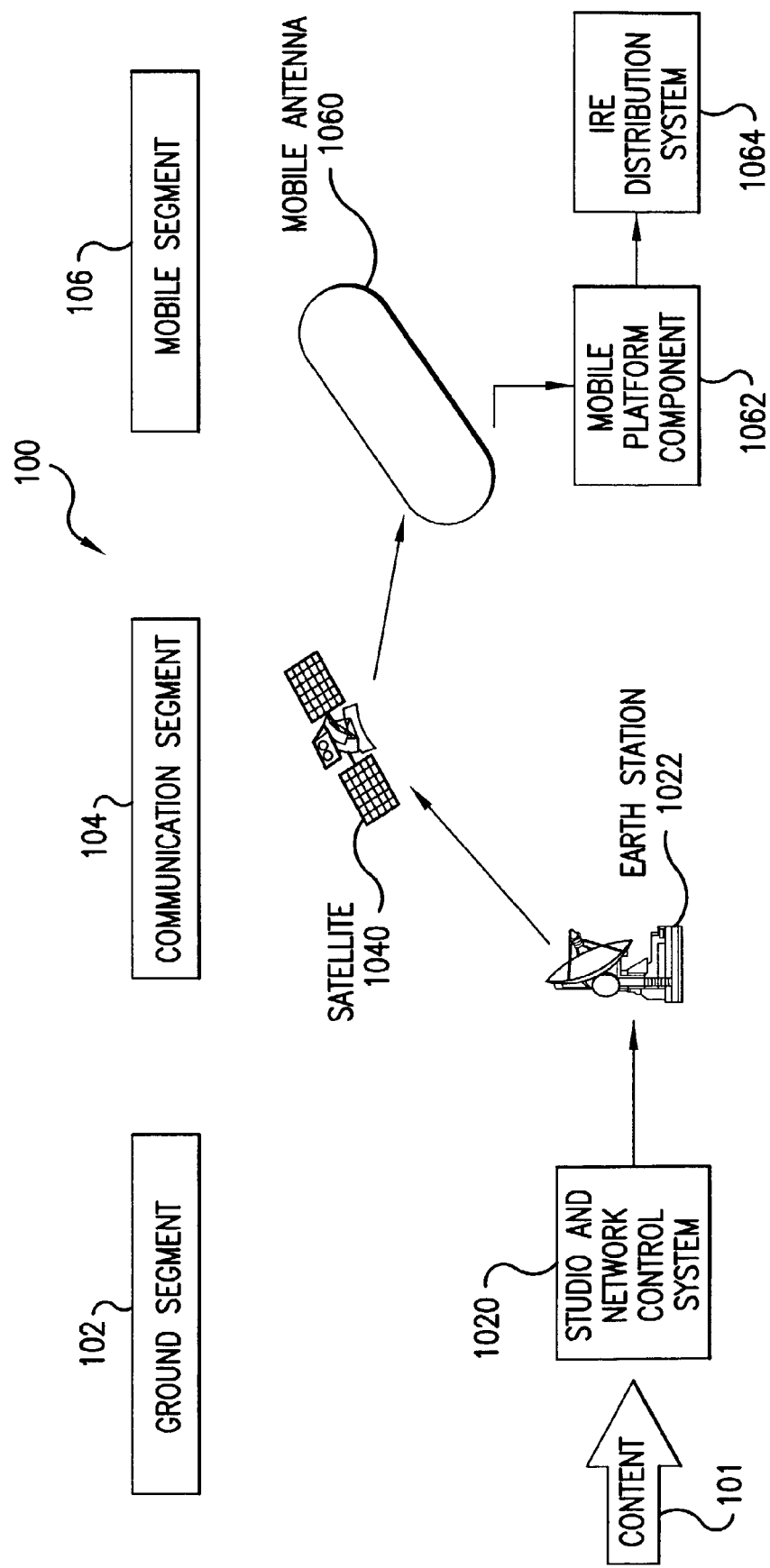
FIG. 1 illustrates the overall system in one exemplary embodiment of the present invention.

FIG. 1 illustrates the overall system 100 in one exemplary embodiment of the present invention. As illustrated in FIG. 1, the system 100 includes a ground segment 102, a communication segment 104, and a mobile segment 106. The ground segment 102 receives content 101, which is input to a studio and network control system 1020 and forwarded to an earth station 1022. The studio and network control system 1020 may be a Network Operations Center (NOC), which will be described below in more detail. The earth station 1022 uplinks the NOC-processed content 101 to a communication device 1040 (in a preferred embodiment, a satellite, in an even more preferred embodiment, a geosynchronous satellite, in an even more preferred embodiment, an INMARSAT geosynchronous satellite). The communication device 1040 downlinks the content 101 to a mobile antenna 1060 of the mobile segment 106. The mobile segment 106 may be an aircraft, such as a commercial airplane or a ship, such as a commercial cruise ship. The content 101 is provided from the mobile antenna 1060 to at least one mobile platform component 1062, and then forwarded to an in-route entertainment (IRE) system 1064 for distribution to passengers aboard mobile segment 106.

Figure 2:
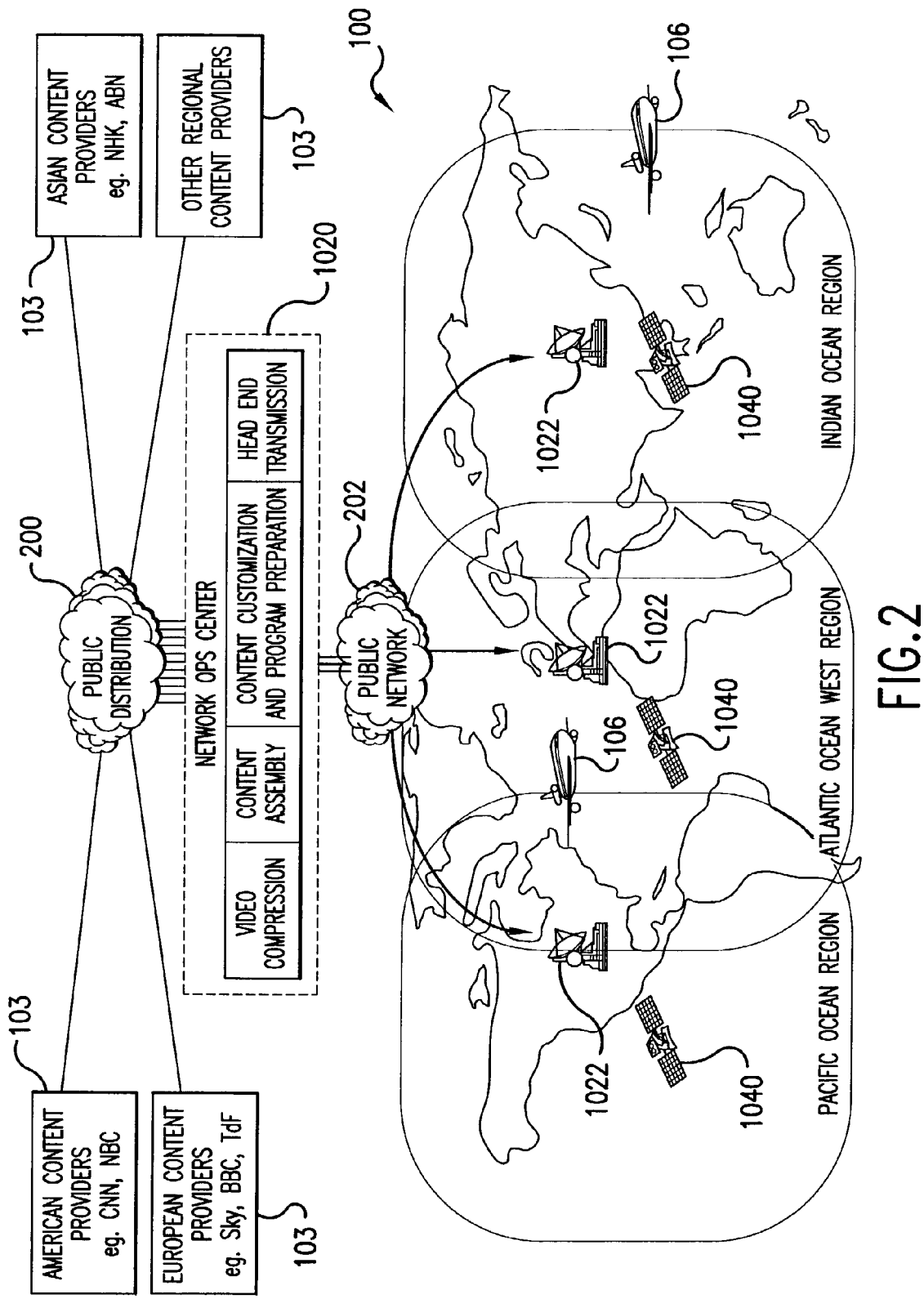
FIG. 2 illustrates the overall system of FIG. 1 in more detail.

FIG. 2 illustrates the overall system 100 in more detail. Local or regional content providers 103, such as American content providers CNN, NBC, etc., European content providers Sky, BBC, TdF, etc., Asian content providers NHK, ABN, and other regional content providers supply content 101 to a public distribution system 200, which then provides the content 101 to the NOC 1020. The NOC 1020 may perform one or more of video compression, content assembly, content customization, program preparation, and head-end transmission to a public network 202. The public network 202 forwards the content 101 to one or more earth stations 1022, which forwards the content 101 to one or more of the communication devices 1040, and on to one or more mobile segments 106. FIG. 2 illustrates the coverage of three (3) INMARSAT geosynchronous satellites, covering the Pacific Ocean region, the Atlantic Ocean West region, and the Indian Ocean region.

Figure 3:
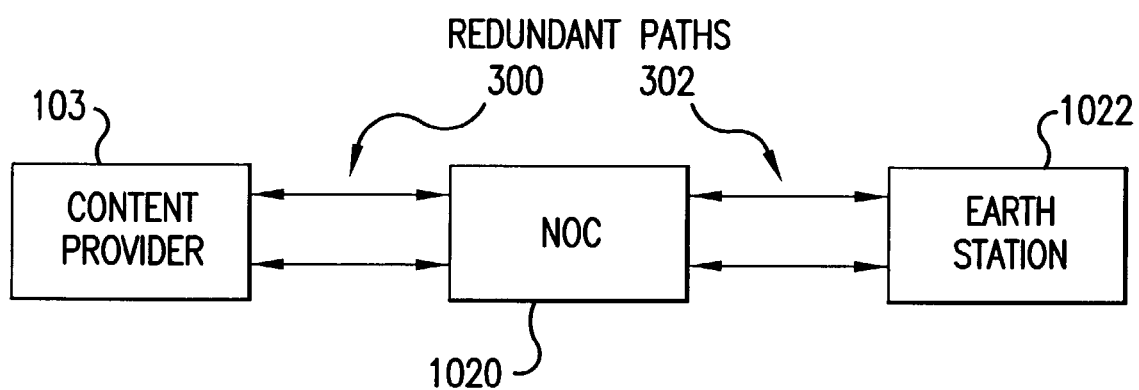
FIG. 3 illustrates the relationship between a content provider, which provides content, a NOC, and an earth station system, in one exemplary embodiment of the present invention.

FIG. 3 illustrates the relationship between a content provider 103, which provides content 101, the NOC 1020, and the earth station 1022 in more detail. The NOC 1020 functions as a bridge between the content provider 103 and passengers aboard the mobile segment 106. The NOC 1020 may perform content collection, production, personalization and distribution. Production may include brand addition, advertising addition, and additional signaling. The NOC 1020 may also provide customer liaison, billing, and help services. The customer liaison services may also include advertising and content selection. The NOC 1020 also monitors and maintains the health, status and configuration of the system 100, including the ground segment 102 and equipment, the mobile segments 106 and equipment, the communication device 1040, and all services provided therebetween. The NOC 1020 may also monitor the health and status of the mobile platform component 1062, the health and status of the earth station 1022, and the power level and frequency. As illustrated in FIG. 3, there may be redundant paths 300, 302 between the content provider 103, the NOC 1020, and the earth station 1022.

Figure 4:
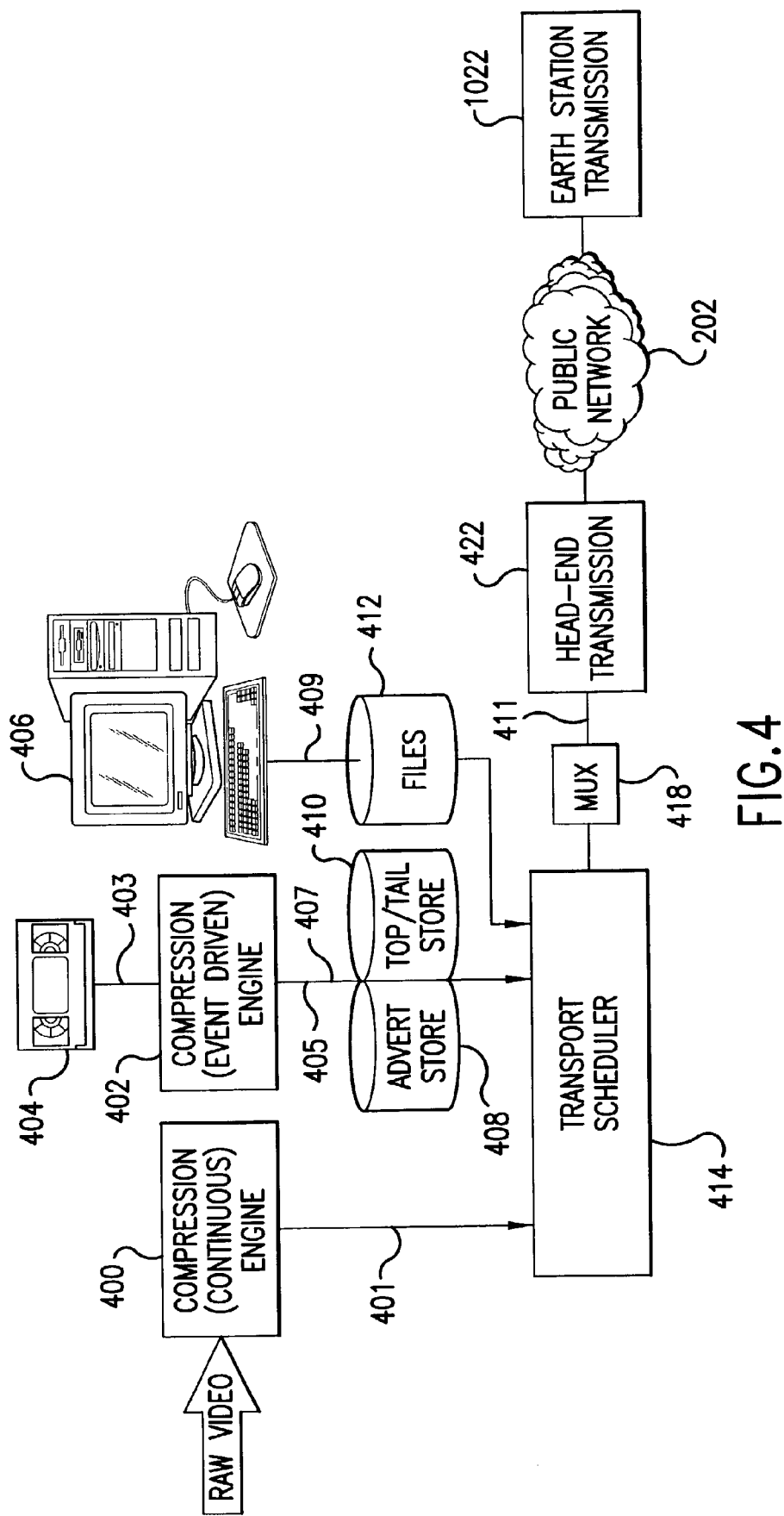
FIG. 4 illustrates the NOC in one exemplary embodiment of the present invention.

FIG. 4 illustrates the NOC 1020 in one exemplary embodiment of the present invention. In the exemplary embodiment of FIG. 4, the NOC 1020 includes a plurality of program servers 1026, a continuous compression engine 400 and an event driven compression engine 402, storage 404 for raw advertisement information, an inter-flight scheduler 406, advertising storage 408, top/tail storage 410, schedule file storage 412, a transport scheduler 414, a multiplexer 418, and a head-end transmitter 422. The head-end transmitter 422 interacts with the public network 202 to communicate with the earth station 1022. The content 101 (for example, video and audio) is provided via a content provider 103 to the program servers 1026 for the continuous compression engine 400. The content is "raw" in that the content 101 may include embedded signaling, local advertising, or other segments whose removal and/or subsequent replacement is desirable.

In one aspect, the continuous compression engine 400 locates gaps in content segments, deletes the content within gaps, keeps track of where the gaps are, and provides the modified content 401 to the MUX 418. In another aspect, the continuous compression engine 400 deletes undesirable segments, keeps track of where the undesirable segments were, and provides the modified content 401 to the MUX 418. Further, if no gaps are present in the content but gaps (or additional gaps) are needed for insertion or addition of customized content such as advertising, gaps may be created in the content segments.

The event driven compression engine 402, which has a data rate independent of the continuous compression engine 400, receives raw advertising information 403 from the raw advertising information storage 404, prepares and stores customized advertisement information 405 in the advertisement storage 408 and prepares branding segments 407, in the top/tail storage 410. It is noted that the raw advertising information 403 in the raw advertising information storage 404 and the branding segments 407 in the top/tail storage 410 are examples of segments whose addition is desirable. However, segments whose addition is desirable are not limited to the raw advertising information 403 and the branding segments 407, and may also include graphic overlays, text streams, or other messaging. The inter-flight scheduler 406 generates schedules 409, which indicate which customized advertisement information 405, branding segments 407, and content 401 should be provided.

The inter-flight scheduler 406 also stores priorities for desirable segments in schedule files storage 412. For example, if a production is to be shown on a five (5) hour flight and 10 minutes of advertising per hour are reserved, that allows for a 50 minute inventory. The inter-flight scheduler 406 generates a schedule 409, which is stored in the schedule file 412 that defines how the 50 minutes of inventory should be filled. The transport scheduler 414 controls the input of schedule files 412 and compressed video from the event driven compression engine 402 to the multiplexer 418.

The schedule 409 and the content 401, the customized advertising 405, and the branding segments 407 (as well as any graphic overlays, text streams, or other messaging, collectively referred to as "inventory") may be directed to passengers aboard the mobile segment 106 as a group or tailored to the individual viewing habits of each individual passenger. The multiplexed output video stream 411, including video and audio content 401, customized advertising 405, and branding segments 407, is transmitted (via a head-end) to the earth station 1022 for transmission, via the public network 202.

In a preferred embodiment, and to maximize the dynamic nature of the overall system 100, actual insertion of customized content occurs locally at the mobile platform component 1062, which preferably is located on an aircraft, but may also be located on another mobile segment 106 such as a transoceanic vessel for example. However, the present invention is not limited to insertion at the mobile platform component 1062, as insertion of customized content could be effected at the NOC 1020.

Figure 5A:
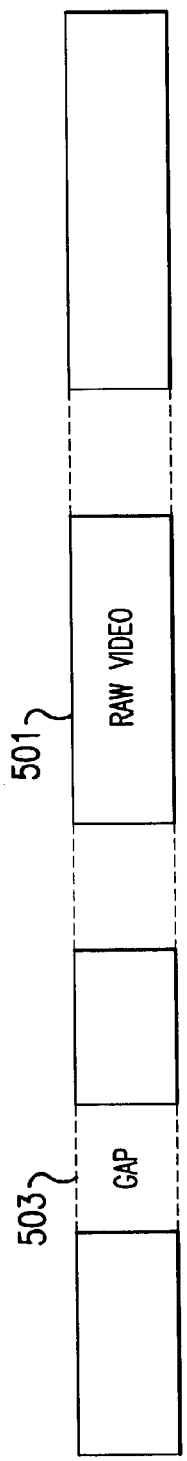
FIGS. 5a–5d illustrate data streams produced by the NOC of FIG. 4, in one exemplary embodiment of the present invention.
Figure 5B:
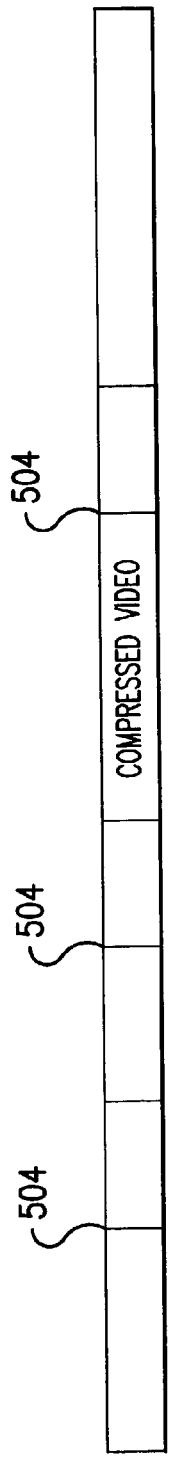
Figure 5C:
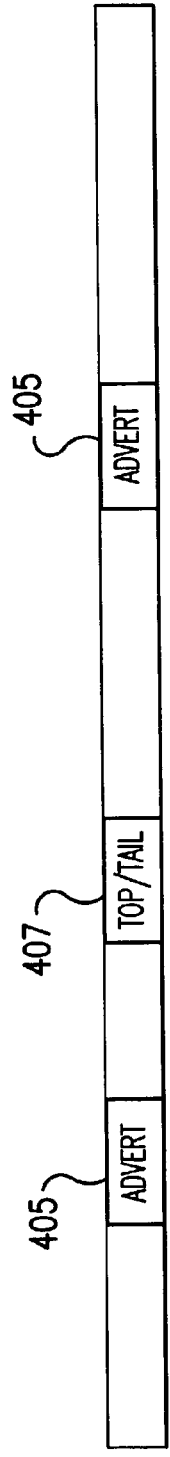
Figure 5D:
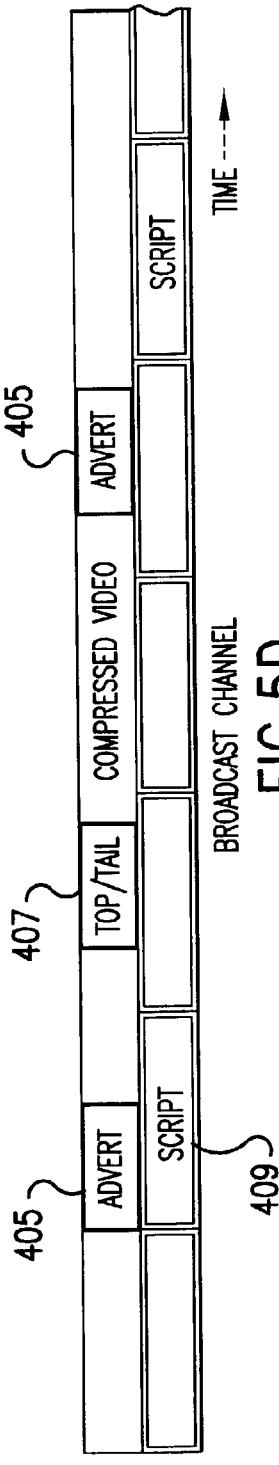

FIGS. 5*a*–5*d* illustrate exemplary data streams produced by the NOC 1020 of FIG. 4. As illustrated in FIG. 5*a*, raw uncompressed video 501 is shown with gaps 503 where customized segments are to be inserted, or where undesirable segments were removed. Additionally, raw uncompressed video 501 could be received which does not include any undesirable segments or gaps 503. The continuous compression engine 400 compresses the raw video 501 to get compressed video, as illustrated in FIG. 5*b*, replacing the gaps with markers 504. The transport scheduler 414, as illustrated in FIG. 5*c* fills available data bandwidth (where gaps occur and where video bandwidth is less than total available bandwidth) with data to refresh the on-board cache, including customized advertising and branding segments. If no gaps are present, gaps may be inserted manually by a NOC operator by inserting cues on a series of frames in which to insert the desired customized advertising 405 and branding segments 407. The multiplexed output video stream 411 and schedule 409 are then forwarded to the earth station 1022, as illustrated in FIG. 5*d*.

Figure 6:
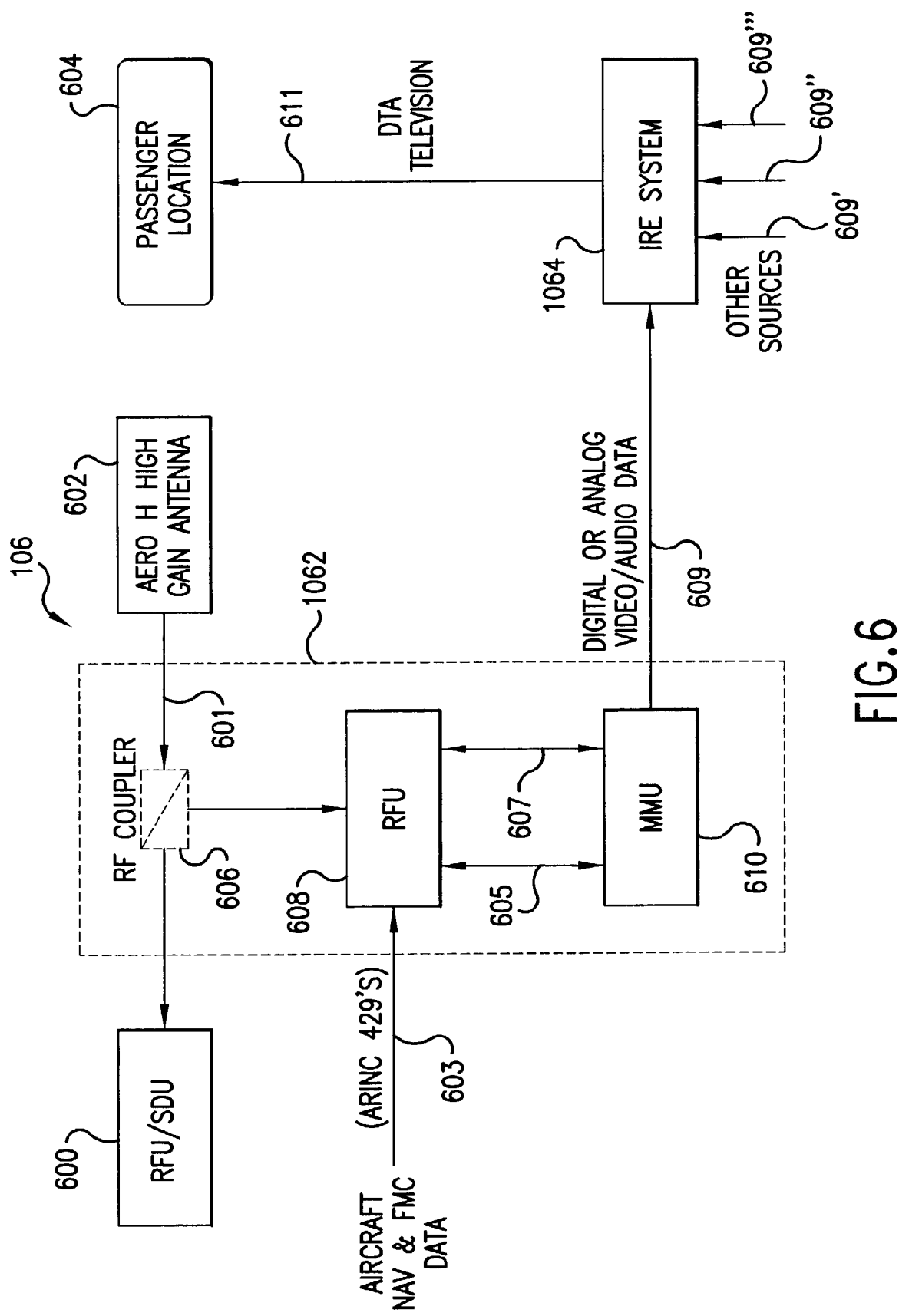
FIG. 6 illustrates the mobile segment of FIG. 1, in one exemplary embodiment of the present invention.

The mobile segment 106 is illustrated in more detail in FIG. 6. FIG. 6 illustrates an RF unit/satellite distribution unit RFU/SDU 600, an antenna 1060, an IRE system 1064, and a passenger location 604, each of which is conventional. The mobile segment 106 also includes the mobile platform component 1062, which is further composed of an RF coupler 606, an RFU 608, and a multimedia unit MMU 610. The antenna 1060 provides an L-band RF signal 601, which is split by the RF coupler 606 and fed to the RFU/SDU 600 and the RFU 608.

The RFU 608 is passively coupled to the antenna 1060 through the RF coupler 606 in that the RFU 608 performs no antenna control or degradation of the L-band RF signal 601 which will continue to go normally to the RFU/SDU 600. The RFU 608 also receives aircraft navigation and flight management computer data 603 from an external source (not numbered). The RFU 608 also demodulates the data into a bit stream 605, which is provided to the MMU 610. The MMU 610 and the RFU 608 also exchange aircraft data 607. The MMU 610 provides digital or analog video/audio data 609 to the IRE system 1064. The IRE system 1064 may also receive digital or analog video/audio data 609', 609", 609''' from any number of other sources (not shown), for example an onboard VCR or tape deck. The IRE system 1064 provides DTA television to each individual passenger location 604.

As illustrated in FIG. 6, the MMU 610 may be implemented as an IP-based communications router, which is fully addressable and capable of simultaneously handling streaming communication and forwarding communication files. The MMU 610 may also act as an application host to provide video/audio processing and television program assembly. The MMU 610 may also provide program schedule management, namely determine when digital or analog video/audio data 609 is shown. The MMU 610 may also perform configuration management by managing the onboard information, including advertisements.

Figure 7:
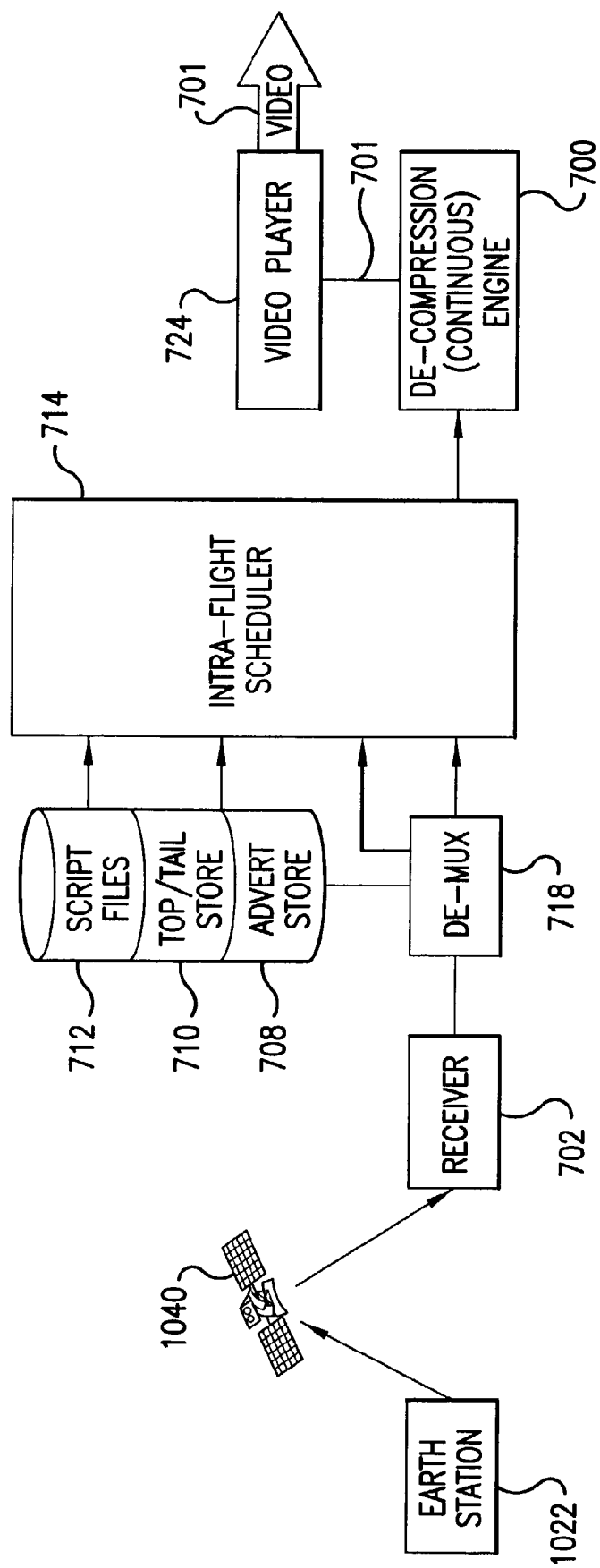
FIG. 7 illustrates the MMU of FIG. 6, in one exemplary embodiment of the present invention.

FIG. 7 illustrates the RFU 608 and MMU 610 in more detail. The multiplexed output video stream 411 including the content 401, the customized advertising 405, and the branding segments 407 (which make up part of the "inventory") produced by the NOC 1020 is provided via the earth station 1022, to the satellite communication device 1040, which transmits the multiplexed output stream to the mobile segment 106, where it is received, via antenna 1060 and RF coupler 606, by a receiver 702 contained in the RFU 608.

The MMU 610 includes a demultiplexer 718, an intra-flight scheduler 714, schedule files 712, top/tail store 710, advertising store 708, a continuous decompression engine 700, and a video player 724 with buffering, switching, and video processing capability. The multiplexed output video stream 411 is received at the demultiplexer 718 from the receiver 702. The demultiplexer 718 demultiplexes the content 401, the customized advertising 405, the branding segments 407, and whatever other desirable segments have been transmitted and the schedule 409 and stores them in their appropriate locations.

The intra-flight scheduler 714 acts as the show builder/scheduler. As described, the customized advertising 405 and the branding segments 407 supplied by the NOC 1020 are cached in advertising store 708 and top/tail store 710 as part of the MMU 610. The intra-flight scheduler 714 builds a show based on the schedule 409 provided from the NOC 1020 and modifies it consistent with avionics data, programming schedules and other timely events. The video player 724 converts a decompressed stream 701 from the continuous decompression engine 700 into base band analog video/audio 609, which is provided to an IRE system that distributes it to a monitor at the passenger location 604 for viewing by each individual passenger.

It is contemplated that the system illustrated in FIGS. 1–7 may provide multiple television channels to an aircraft's existing in-route entertainment head end. These channels may be allocated in any manner, for example, to news channels, sports channels or financial channels. It is also contemplated that the system illustrated in FIGS. 1–7 may deliver multiple audio channels. These audio channels may be associated with the video channels or unrelated. It is also contemplated that multilingual audio channels and text channels may be provided to additional television channels.

It is contemplated that the video provided is "VHS" video quality as viewed on a 10.5" active matrix LCD display with 320×240 pixels. It is further contemplated that the audio quality may be CD quality or monaural FM quality, depending on available bandwidth. It is further contemplated that the video/audio compression may be selected to provide the best performance based on the type of video/audio being provided.

Figure 8A:
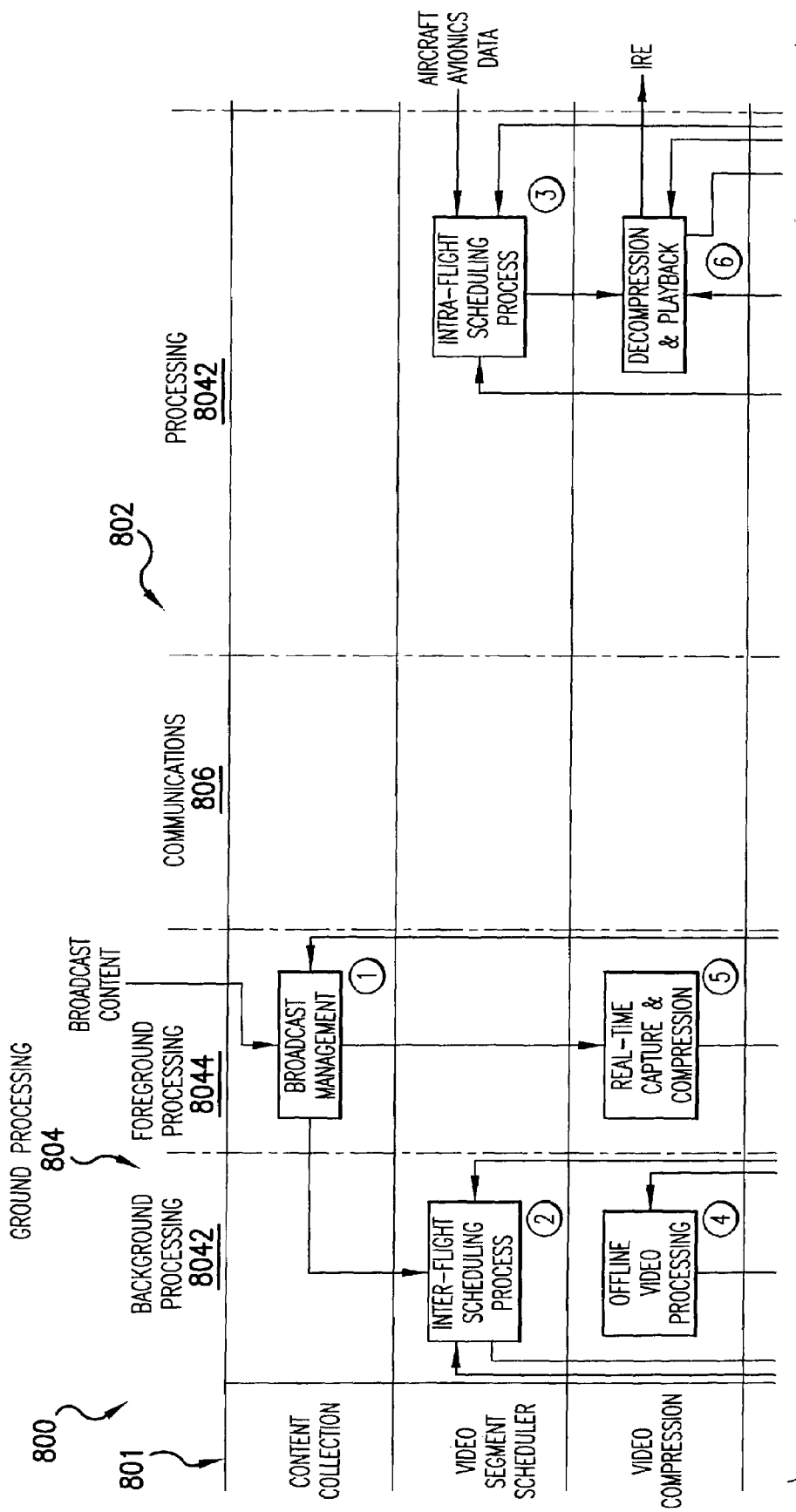
FIGS. 8A and 8B illustrate an overall architecture of the system of FIG. 1, in one exemplary embodiment of the present invention.
Figure 8B:
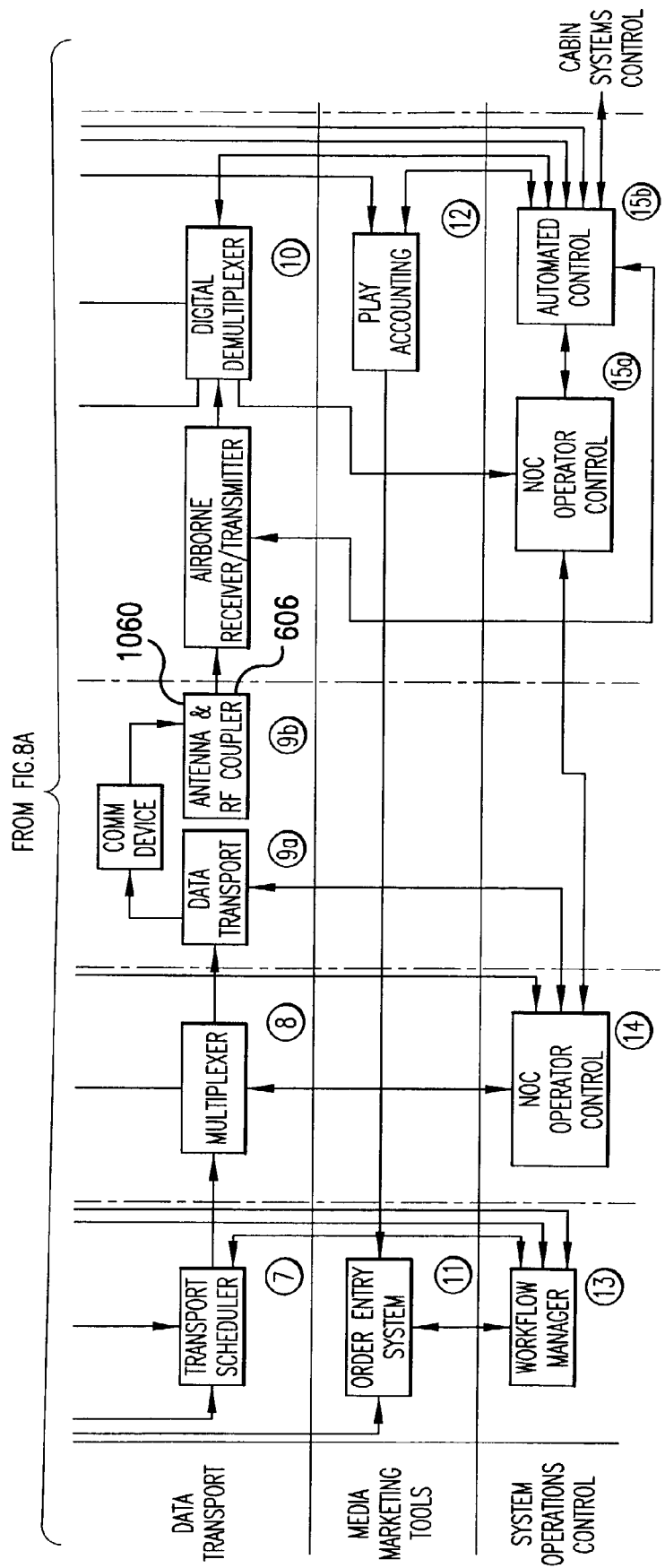

FIGS. 8A and 8B illustrate an exemplary overall architecture 800 of the system 100. As shown, the overall architecture 800 is composed of logical layers 801 of processing, divided into segments 802 differentiated by hardware, geography, or type of processing. The segments 802 are geographically dispersed in a combination of ground processing 804, communications 806 and mobile platform 808 and contain both hardware and software applications. It is noted that the ground processing 804 is further broken down into a background processing segment 8042 and a foreground processing segment 8044. Each of the segments and each of the logical processing layers are described below.

The background processing segment 8042 is composed of automated inter-flight scheduling process 2, offline video processing 4, a transport scheduler 7, an order entry system 11, and a workflow manager 13. The inter-flight scheduling process 2 determines, to the extent possible prior to takeoff, the video segments to be shown on each route. The inter-flight scheduling process 2 forwards schedule information to the transport scheduler 7. Offline video processing 4 receives video segments from content providers (or customers), compresses the data, and forwards the data to the transport scheduler 7. The order entry system 11 permits salespeople to prepare contracts based on customer criteria, the selected video segments, and flight schedule, the workflow manager software 13 manages the data associated with workflow that is to be further described, and enforces business rules regarding the workflow. Aspects of each of the aforementioned elements in the background processing segment 8042 are described in further detail below.

The foreground processing segment 8044 monitors and operates the product stream of video, audio, and data traffic. Content providers 103 (such as commercial television) furnish live television to the NOC 1020 where a broadcast management function 1 routes the live television to a real-time capture and compression function 5. The compressed streams are then sent to the multiplexer 418 (function 8). The multiplexer 418 combines the compressed live video and audio streams 401; the compressed video and audio files 405, 407 from the off-line compression systems 408, 410; schedule information from the inter-flight scheduling process 2; other traffic, and messages generated by the ground processes 8042, 8044. The multiplexed output video stream 411 is allocated to one or more physical satellite channels and transmitted to the mobile segment 106. The broadcast management function 1 also provides inputs to the inter-flight scheduling process 2. The NOC operator control function 14 of the NOC 1020 monitors the status of hardware and software processes located on-site at the ground segment 102, at earth stations 1022, and aboard the mobile segment 106.

The communications segment 806 receives the multiplexed output video stream 411 from the NOC 1020 (in an exemplary embodiment, via a WAN interface connected to a commercial communications system), and then transforms the multiplexed output video stream 411 into an RF signal (by the transmit subsystem 9*a*) that is forwarded via the communication device 1040 to the mobile segment 106.

The mobile segment 106 includes the mobile platform 808, which represents both hardware and software processes; hereinafter mobile segment 106, unless otherwise noted, is referred to as mobile platform 808. The mobile platform 808 further includes the steerable mobile antenna 1060, which receives the satellite signal and the RF coupler 606, which provides downlinked RF energy to the RFU 608 (Functions 9*a* and 9*b*). The steerable mobile antenna 1060 is controlled by other onboard systems not affiliated and not controlled by the system 100.

The mobile segment 106 converts the RF signal into digital streams, performs digital demultiplexing 10 (via demultiplexer 718), facilitates intra-flight scheduling process 3, performs digital decompression and playback 6, play accounting 12, and remote 15*a* and automated 15*b* system control functions.

As shown in FIGS. 8A and 8B, the overall architecture 800 is composed of logical layers (collectively labeled as 801) of processing. In the content collection logical layer 801, the NOC 1020 receives content 101, which may include real-time broadcast video streams and/or recorded video segments, for transmission preparation. Third parties or in-house productions may provide broadcast content or segment inserts. Third party providers can include local or regional content providers 103, such as American content providers CNN, NBC, etc., European content providers Sky, BBC, TdF, etc., Asian content providers NHK, ABN, and other regional content providers supply content to the public distribution system 200. On receipt of real-time broadcast video (via for example, ground station satellite downlink or cable), the broadcast stream 101 is directed to the continuous compression engine 400, processed as described above, multiplexed and passed to head-end transmission 422. The real-time broadcast 101 may also be alternately or concurrently compressed and stored locally for later usage. For physically delivered or downlinked video segments, the content 101 is identified, categorized and stored on databases within NOC 1020.

Figure 9:
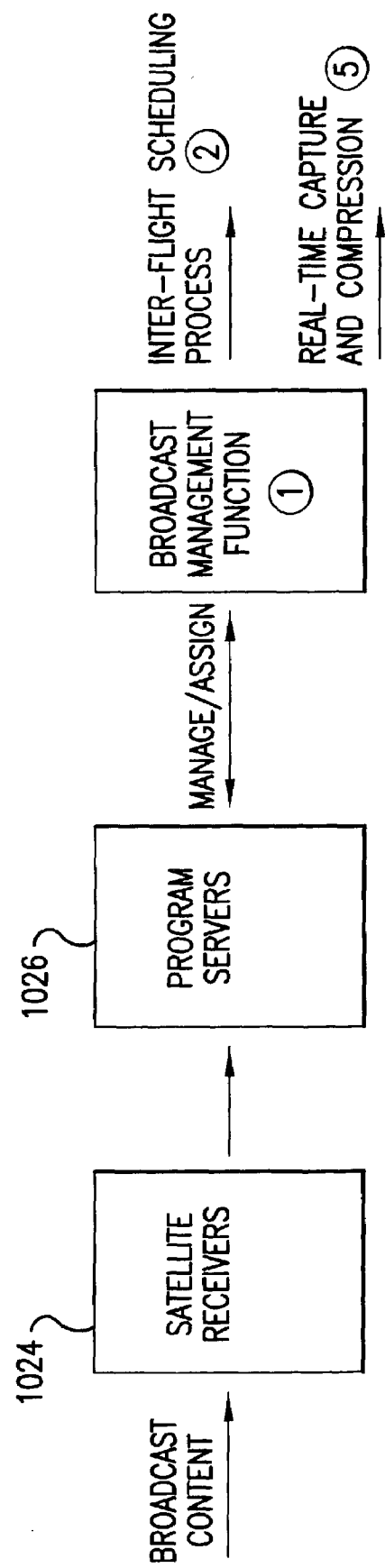
FIG. 9 illustrates the content collection logical layer, in one exemplary embodiment of the present invention.

FIG. 9 illustrates the flow of data for the content collection logical layer 801 within the NOC 1020. The broadcast management function 1 manages and produces live audio/video programming. Broadcast content 101 (such as television programming) is received via at least one satellite receiver 1024 (although other conventional sources, including cable, are also within the scope of this invention) and converted to a digital form through conventional means. The digitized content is routed to a series of program servers 1026. Operational staff at the NOC 1020 monitors the quality and content of the broadcast content 101. Programming is assigned to specific satellite regions according to a program schedule. Program scheduling is established by operational staff and can be accomplished automatically under the control of the broadcast management function 1. The program schedule is then transmitted to inter-flight scheduling process 2. The live broadcast content 101 is forwarded to the real-time capture and compression function 5 from the program server 1026, where the live broadcast content 101 is converted to a compressed audio/video stream 401 (such as MPEG-4) for forwarding to the mobile platform 808.

Figure 10:
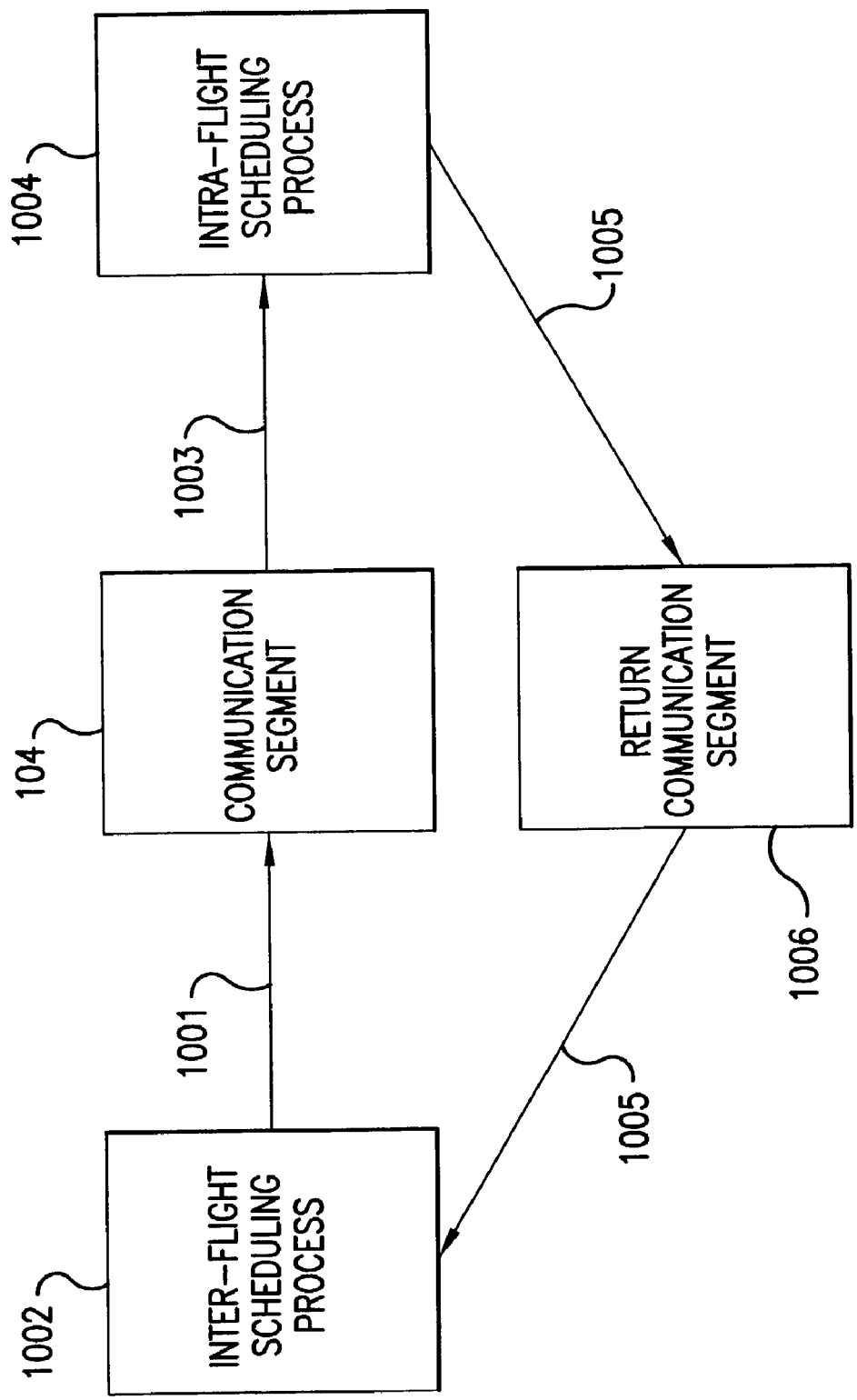
FIG. 10 illustrates the video segment scheduler logical layer, in one exemplary embodiment of the present invention.

The video segment scheduler logical layer 801 is illustrated in FIG. 10. The video segment scheduler logical layer 801 generates insertion schedules for video segments such as raw advertising information 403, branding segments 407 and/or other video segments within the live broadcast 101. A unique schedule of video segments can be generated for each scheduled flight for each day. The schedule produced is used to customize the television program displayed on each individual mobile platform 808.

The video segment scheduler logical layer 801 may be partitioned into two processes, as illustrated in FIG. 10. The inter-flight scheduling process 1002 runs in the NOC 1020. The intra-flight scheduling process 1004 runs on the mobile platform 808. The two processes 1002, 1004 work collaboratively. The inter-flight scheduling process 1002 develops a predictive video segment insertion schedule 1001 that is based on published flight and program schedules. The intra-flight scheduling process 1004 receives the predictive video segment insertion schedule 1001 generated by the inter-flight scheduling 1002 process, via the communication segment 104, and refines the predictive video segment insertion schedule 1001 to produce a refined video segment insertion schedule 1003, which accounts for changes in the flight and program schedules as they unfold in real-time.

Any changes 1005 made by the intra-flight scheduling process 1004 to the predictive video segment insertion schedule 1001 generated by the inter-flight scheduling process 1002 are periodically communicated to the inter-flight scheduling process 1002 via any available return communication segment 1006 (for example, an air-to-ground communication path). These changes are factored into subsequent iterations by the inter-flight scheduling process 1002, thus forming an adaptive closed-loop video segment insertion schedule process. The history of the changes and/or an actual achieved video segment insertion schedule 1005 may be tracked and provided to a billing system to reconcile invoices for booked versus achieved insertion schedules.

Figure 11:
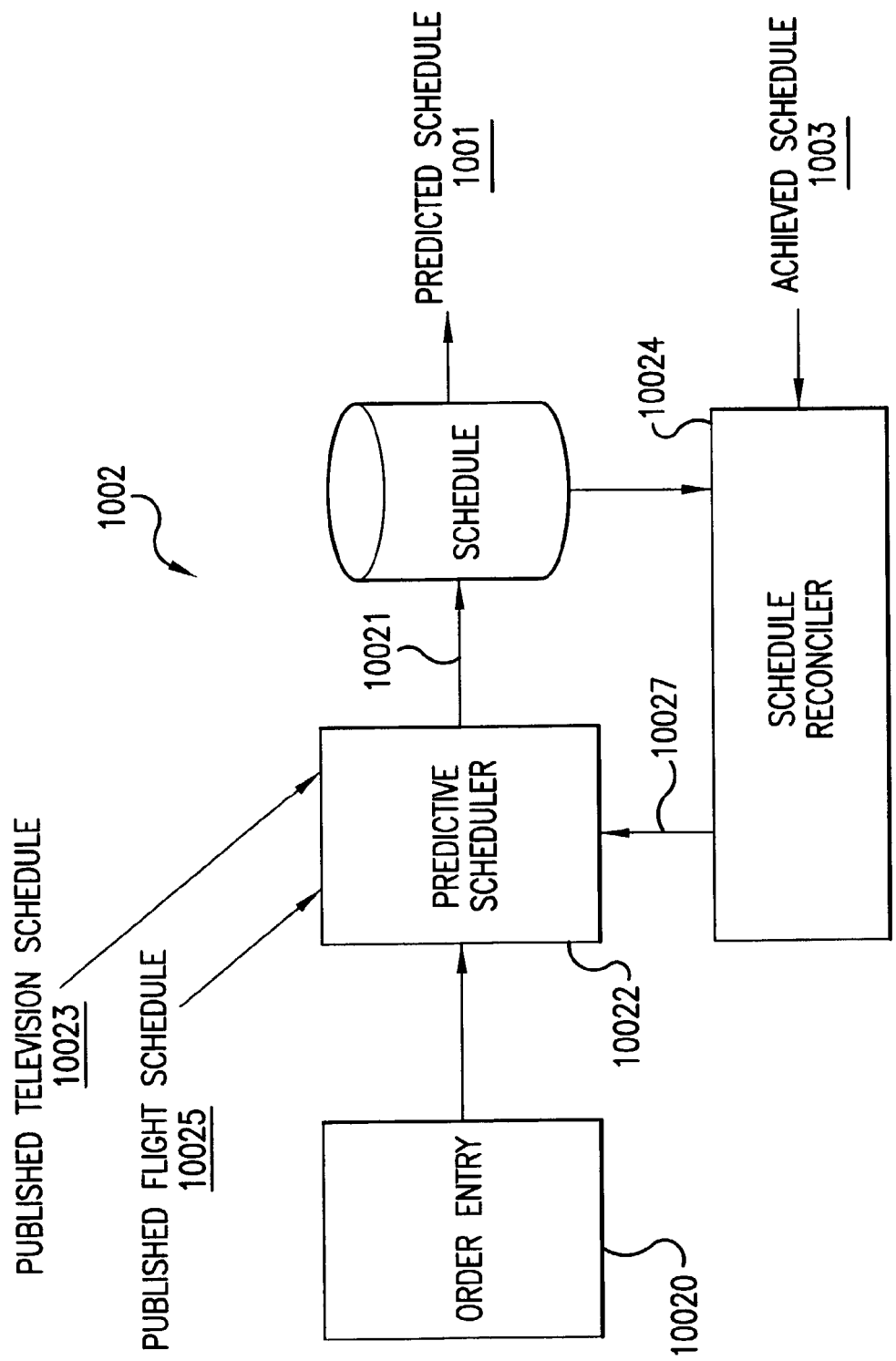
FIG. 11 illustrates the inter-flight scheduling process of FIG. 10, in one exemplary embodiment of the present invention.

The inter-flight scheduling process 1002 is illustrated in more detail in FIG. 11. As described, the inter-flight scheduling process 1002 assigns specific video segments to specific flights. The inter-flight scheduling process 1002 may include one or more of the following processes:

1. an order entry process 10020, which include the capture and assembly of any video segments and criteria attributes (may be done by an operator);
2. a predictive scheduling process 10022, which creates a schedule 10021 constrained by criteria, such as a published video segment schedule 10023 and a published flight schedule 10025; and
3. a schedule reconciler 10024, which compares the achieved schedule 1001 with the predictive video segment insertion schedule and generates new, revised constraint criteria 10027 for the video segment that is provided to the predictive scheduler 10022. The new, revised constraint criteria 10027 drive the next iteration of the predictive scheduling process 1002.

Constraints are associated with each video segment that is to be scheduled for insertion via the inter-flight scheduler. These constraints 10027 can include:
- origin of flight;
- destination of flight;
- airline;
- flight number;
- level of viewership;
- date range;
- geographic location;
- time (GMT);
- time since takeoff;
- expected time until landing;
- channel (news channel, sports channel);
- program type (e.g. Golf);
- program (e.g. a particular golf match); or
- number of insertions desired.

The operator specifies a subset of the exemplary criteria shown above and the total number of insertions for each video segment to complete an order entry.

The predictive scheduling process 10022 may be implemented as a search engine that examines the available video segment insertion slots on scheduled flights that have attributes matching the specified constraints. The predictive scheduling process 10022 develops a predictive video segment insertion schedule 1001 that satisfies the constraint criteria 10027.

Generation of the predictive video segment insertion schedule 1001 is an iterative process that may involve the operator who can accept or reject the predictive scheduler's 10022 recommended schedule. The operator can also change the constraints 10027 applied to the video segment. Once the predictive video segment insertion schedule 1001 for the video segment is determined, it may be placed into a database.

Periodically, the intra-flight scheduling process 1004 reports the history of the changes and/or an actual achieved video segment insertion schedule 1005 for the video segment to the schedule reconciler 10024. The schedule reconciler 10024 compares the actual achieved video segment insertion schedule 1005 with the predictive video segment insertion schedule 1001 and generates a revised predictive schedule designed to reconcile the actual achieved video segment insertion schedule 1005 with the video segment insertion requirements.

Figure 12:
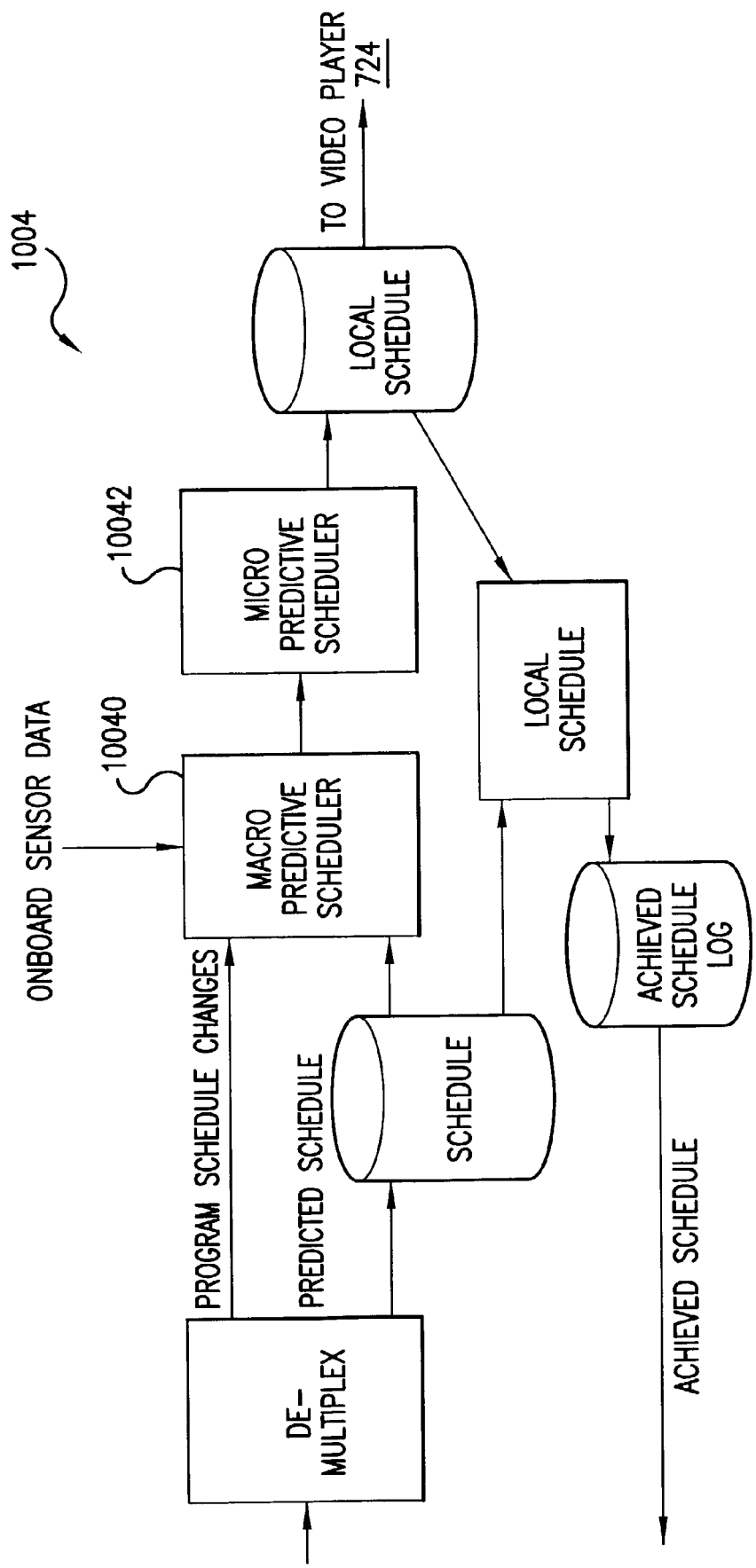
FIG. 12 illustrates the intra-flight scheduling process of FIG. 10, in one exemplary embodiment of the present invention.

The intra-flight scheduling process 1004, illustrated in more detail in FIG. 12, modifies the predictive video segment insertion schedule 1001 to accommodate changes in circumstance that affect the ability to act in accordance with the video segment insertion constraints 10027. At least two levels of circumstance change may be accommodated. Major changes may include factors such as flight delay for example, and wholesale changes to the program schedule that typically affect the schedule on the order of minutes or hours. A macro predictive scheduler 10040 may be used to act upon these major changes. Minor changes may include short program schedule discrepancies that arise due to such factors as program schedule overruns whose duration are typically a minute or less. A micro predictive scheduler 10042 may be used to act upon these minor changes.

Changes in circumstance may be signaled based on input provided by other onboard systems and by program schedule changes supplied from the NOC 1020 (e.g. cancellation of a sports program event). External input variables may include:
- flight departure delays;
- longer/shorter flight schedule;
- video reception interruptions; or
- viewership levels.

The intra-flight scheduling process 1004 may include one or more of the following processes:
- the macro predictive scheduler 10040, which selects the schedule corresponding to the particular route from among a locally maintained database of predicted schedules supplied by the Inter-Flight Scheduling process 1002 and generates a revised schedule 10041 based on input supplied by external onboard systems and by the NOC 1020;
- the micro predictive scheduler 10042, which creates a locally predicted schedule 10043 that is based on the revised schedule 10041 generated by the macro predictive scheduler process 10040;
- a reconciler process performed by the macro predictive scheduler 10040, which compares an achieved schedule 10044 from an achieved schedule log with a locally predicted schedule to generate new, revised criteria for the particular video segment that is provided to the local predictive scheduler.

The intra-flight scheduling process 1004 may continually refine the onboard video segment insertion schedule as the mobile platform process 808 progresses through its route plan. The schedule generated is used by the video player 724 to insert video segments into the program stream.

Figure 13:
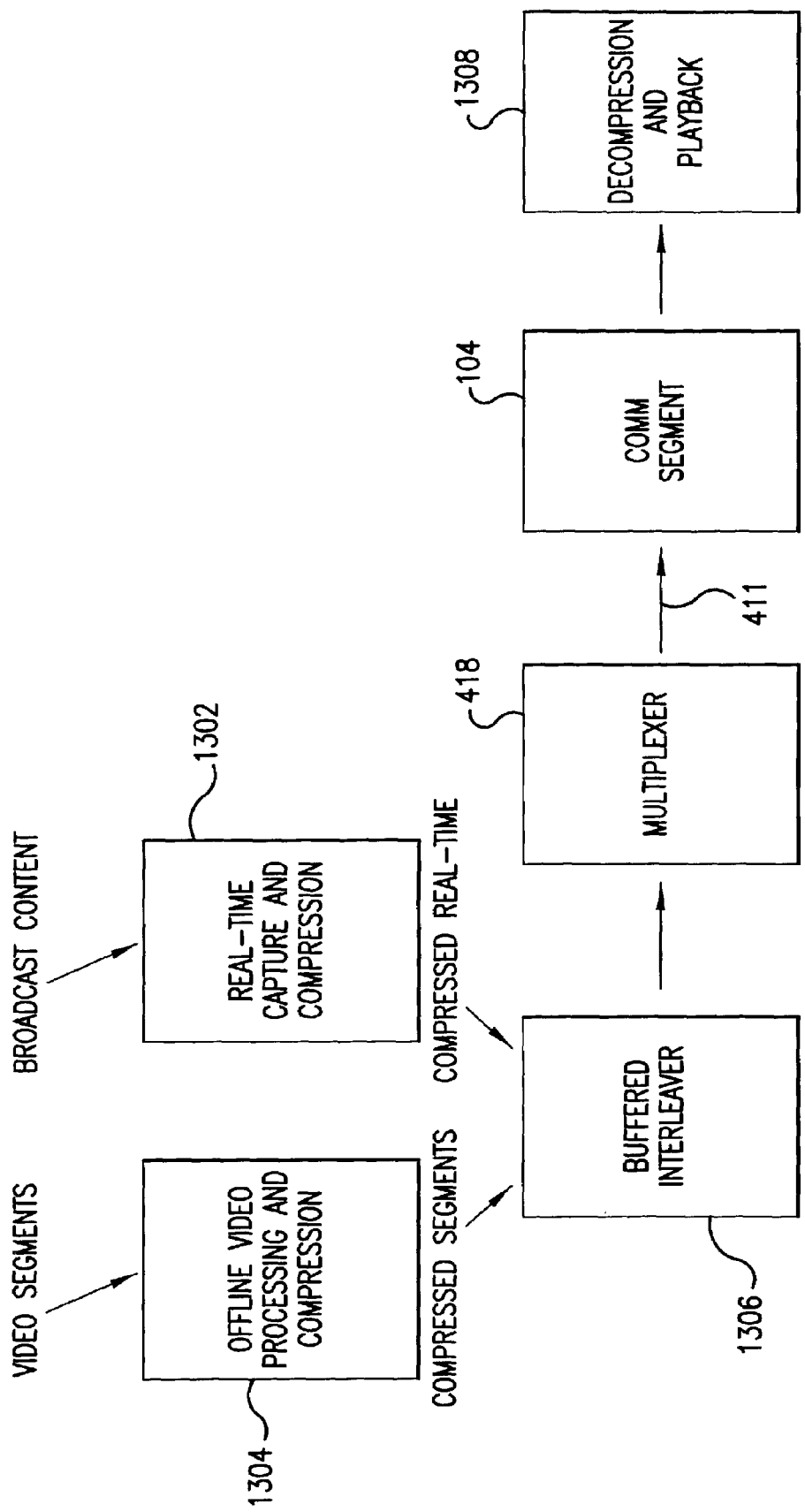
FIG. 13 illustrates the video compression/decompression logical layer, in one exemplary embodiment of the present invention.

The video compression/decompression logical layer 801 is illustrated in FIG. 13. Video compression involves the conversion of produced video segments and real-time video streams into compressed digital format for storage, data transport and playback. Video segments and real-time video streams may undergo separate collection and compression. Real-time video stream compression 1302 should be continuous whereas off-line video segment compression 1304 is more likely event driven. The multiplexed packet stream 411 is transported over the space segment 104 and fed to decompression and playback processes 1308 on the mobile platform 808.

Figure 14:
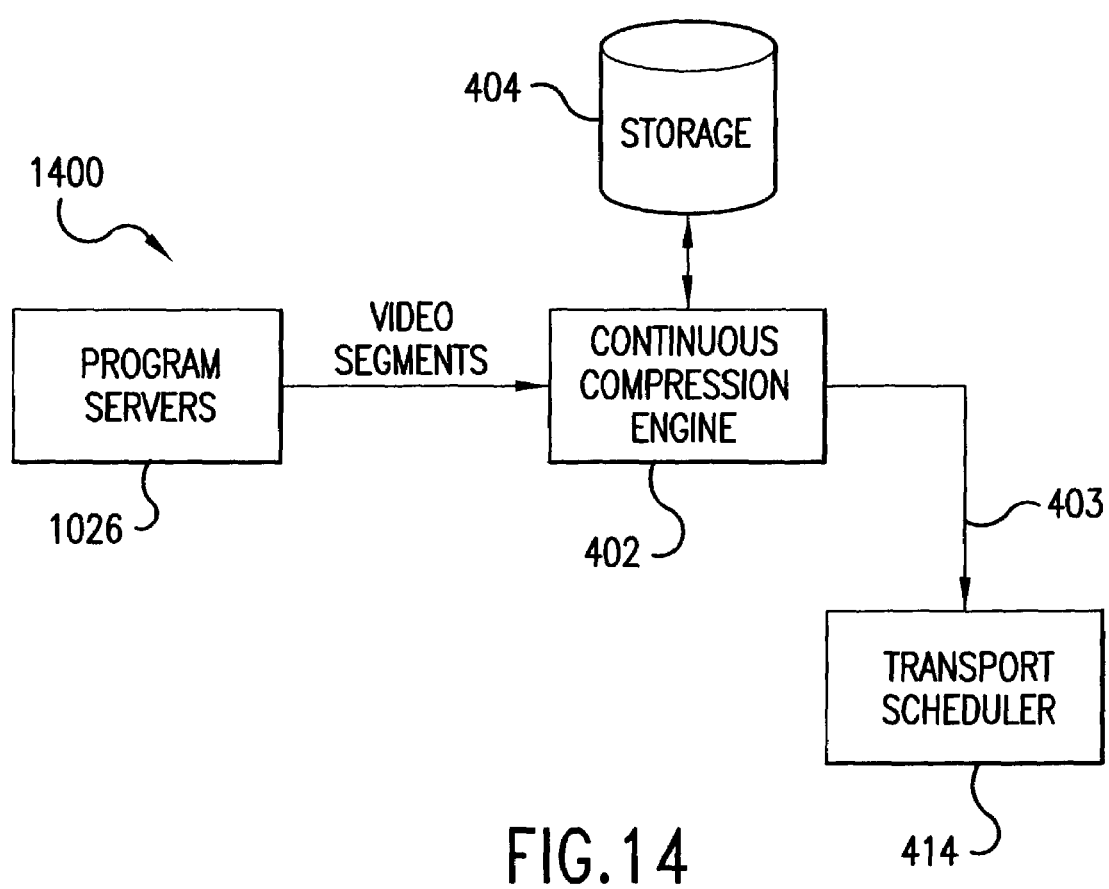
FIG. 14 illustrates offline video processing, in one exemplary embodiment of the present invention.

FIG. 14 illustrates exemplary offline video processing 1400, which may be part of the background processing 8042. The offline video processing 1400 may involve the coordination of both analog and digital format video segments for digitized compression. The offline video processing 1400 formats the video segments ultimately for insertion into broadcast stream slots during playback on the mobile platform 808.

An operator manages the offline video processing 1400. Raw video segments, such as raw advertisement information, may be stored in storage 404 (videotape or as a digital file, as examples). The video segments are processed in the event driven compression engine 402, as described above with respect to FIG. 4.

The compressed video segments 403 may be stored in separate databases, according to type (e.g., advertisement 408, top/tail 410). The video segments are transmitted to the Transport Scheduler 414 (see also the Transport Scheduler function 7 of FIG. 8B). Splicing of compressed video segments with real-time video streams may occur at the time of decompression and playback on the mobile platform 808. As gaps 503 are detected in the real-time video streams, the video segments are inserted.

In accordance with the real time capture and compression function 5 of FIG. 8A, the continuous compression engine 400 continuously compresses real-time video during production as part of the foreground processing. The continuous compression engine 400 strips out and discards video and audio within specified commercial gaps 503, as designated by audio-based and video-based cues. These commercial gaps 503 are marked within the stream, as illustrated by the aforementioned gap markers 504 of FIG. 5b. The onboard video player 724 may use the gap markers 504 to insert video segments within the real-time streams.

The decompression and playback function 6 of FIG. 8A occurs onboard the mobile platform 808. The compressed, multiplexed audio/video stream is transmitted over the communications segment 806 to the mobile platform 808. On the mobile platform 808, the stream is demultiplexed for decompression and playback. A media processor in the video player 724 receives the demultiplexed stream, scales the video, buffers the data and plays the data to audio output and video output.

Figure 15:
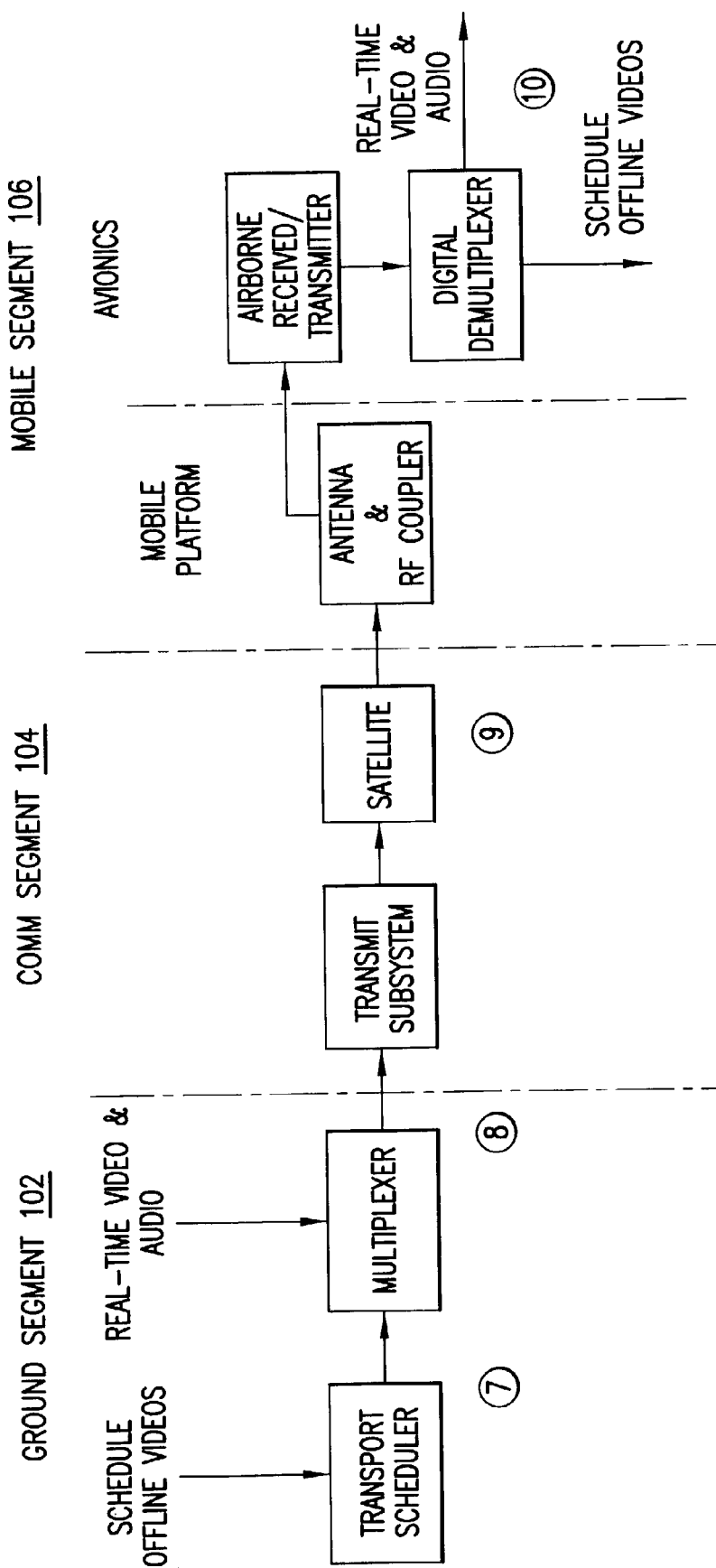
FIG. 15 illustrates the data transport logical layer, in one exemplary embodiment of the present invention.

The data transport logical layer 801 is illustrated in FIG. 15. The data transport logical layer acts as the communications bridge between the NOC 1020 and the mobile platform 808. Real-time streaming video and audio, video segments and supporting data are multiplexed by multiplexer 418, at the NOC 1020, forwarded to at least one earth station 1022, where they are modulated and transmitted (in one exemplary embodiment, via one or more geosynchronous satellite) to the mobile platform 808.

On the mobile platform 808, the broadcast signal is received by the mobile antenna 1060 and the passive RF coupler 606, to the LRU 1062. The broadcast signals are demodulated, extracted, demultiplexed and forwarded to the video playback and cache management systems. Each component of the data transport layer 801 is discussed below.

The transport scheduler function 7 of FIG. 8B uses logical rules of processing precedence to ensure that the segment schedules and the non-real-time video/audio segments are available at the appropriate time on the mobile platform 808.

The multiplexer 418 of the NOC 1020 converts multiple inputs of compressed packetized elementary streams of video segments and supporting information, into a single packetized stream for transmission. An exemplary implementation packages multiple MPEG-4 video and audio streams together with file data for cache update as a single MPEG-2 transport stream.

Input packet types received on the mobile platform 808 are of four varieties: video, audio, schedules and files. The primary streams of live content are is given high-priority processing treatment from the data transport components. The transport scheduler function 7 determines the sequencing of the remaining non-real-time video/audio segments (such as raw advertisement information, top/tails etc.,) and file information (schedule) and control schedule 409) into the multiplexer 418.

The multiplexer 418 formats the data streams into packets, buffers the packets to ensure steady transmission and sends them to a splitter. The splitter takes the fixed-length packets from the multiplexer 418 and concatenates them into larger packets. The resulting stream of packets is communicated to an earth station 1022 via a WAN connection.

The satellite communications functions 9a and 9b of FIG. 8B are used to forward the transmissions to the mobile platform 808. Data packets are received from the NOC 1022 via the WAN connection and input into the earth station. Transmit subsystem 9a converts the packets to a modulated RF signal. The RF signal is transmitted to the communication segment 806 (including, for example, a geosynchronous satellite) that forwards the transmission to a subscribing mobile platform 808 through an existing antenna 1060, where the data is directed through a passive RF Coupler 606 to the RFU 608.

The present invention makes use of existing mobile platform antenna without interfering with its intended functionality. A standard attenuator may be replaced with the RF coupler 606 that splits the signal. A portion of the L-Band signal is sent to the RFU 608, while the principal signal simultaneously travels to the aircraft existing system without any degradation of signal strength.

The RF signal is passed to the RFU 608, where it is decoded and demodulated by the receiver 702. The receiver 702 forwards the stream(s) of digital information to the demultiplexer 718 where it is reordered into a single stream, demultiplexed, and forwarded to the decompression and playback function 6 for delivery to the mobile platform's IRE system 1064. The receiver 702 is also capable of receiving tuning directions and sending status information to the MMU 610.

The demultiplexer 718 converts the streams from the receiver 702 to their original order and form. The digital streams from the receiver 702 are first reordered according to the sequential numbers that were assigned on ground by the multiplexer 418, and then broken into separate streams. The demultiplexer 718 reconstitutes each video and audio stream for distribution to the decompression and playback function 6. Schedule files are reconstructed and forwarded to the intra-flight scheduling process 1004. The control schedules are reconstructed and forwarded to the playback system.

Figure 16:
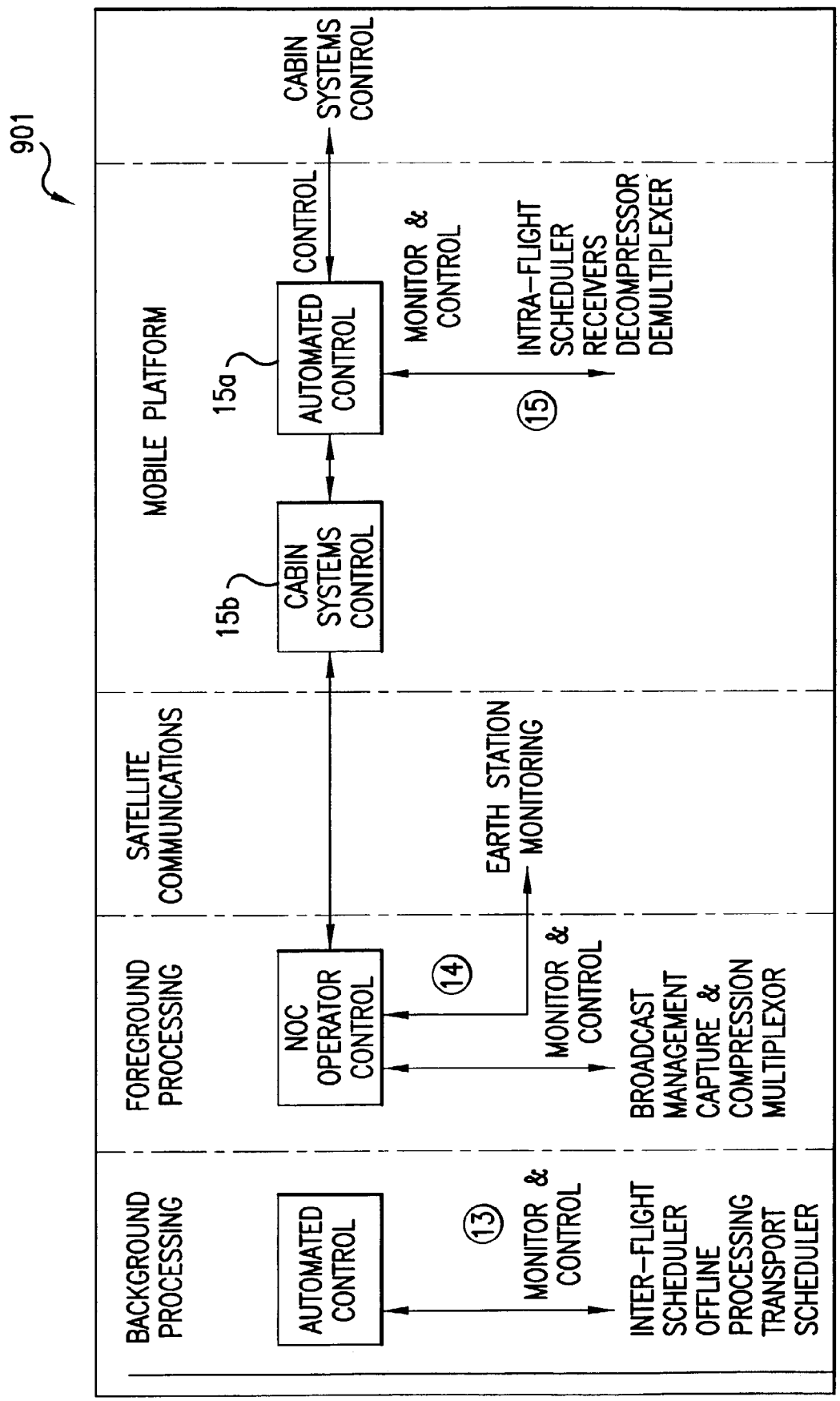
FIG. 16 illustrates the data flow for media marketing tools logical layer 801, in an exemplary embodiment of the invention.

FIG. 16 illustrates the data flow for media marketing tools logical layer 801. The media marketing tools logical layer 801 serves as the interface for the scheduling and billing of commercial video segments. The media marketing tools logical layer 801 is also used to reconcile actual video segment plays with scheduled plays. The results of the compare are used for both rescheduling and billing.

The media marketing tools logical layer 801 may include one or more of the following functions:

an order entry function 11 for use by salespeople, accounting, etc.;

a play accounting function 12 (including a billing software interface and an automated billing software system.

The order entry function 11 is a series of order entry screens that allow the salespeople to insert customer criteria preferences, and query a flight database as to the best matches available. Other screens provide the salespeople with the capability to modify an existing sales contract schedule or delete (cancel) scheduled video segments. The order entry function 11 permits the salespeople to output a contract based on customer criteria, the selected video segments, and flight schedule.

The MMU 610 records parameters onto a transaction file for each instance of a video segment play. The file is sent to the play accounting function 12 where the file is transmitted back to the order entry function 11. The play information is used for comparison with the schedule and subsequent billing/rescheduling of segments. Parameters captured by the MMU 610 include the identification of the video segment and the date/time that the video segment played.

A billing system and billing software may be used to access and review billing information. The billing system can automatically prepare and/or transmit billable items to customers based on the play history provided by the MMU 610 and the customer contract.

Figure 17:
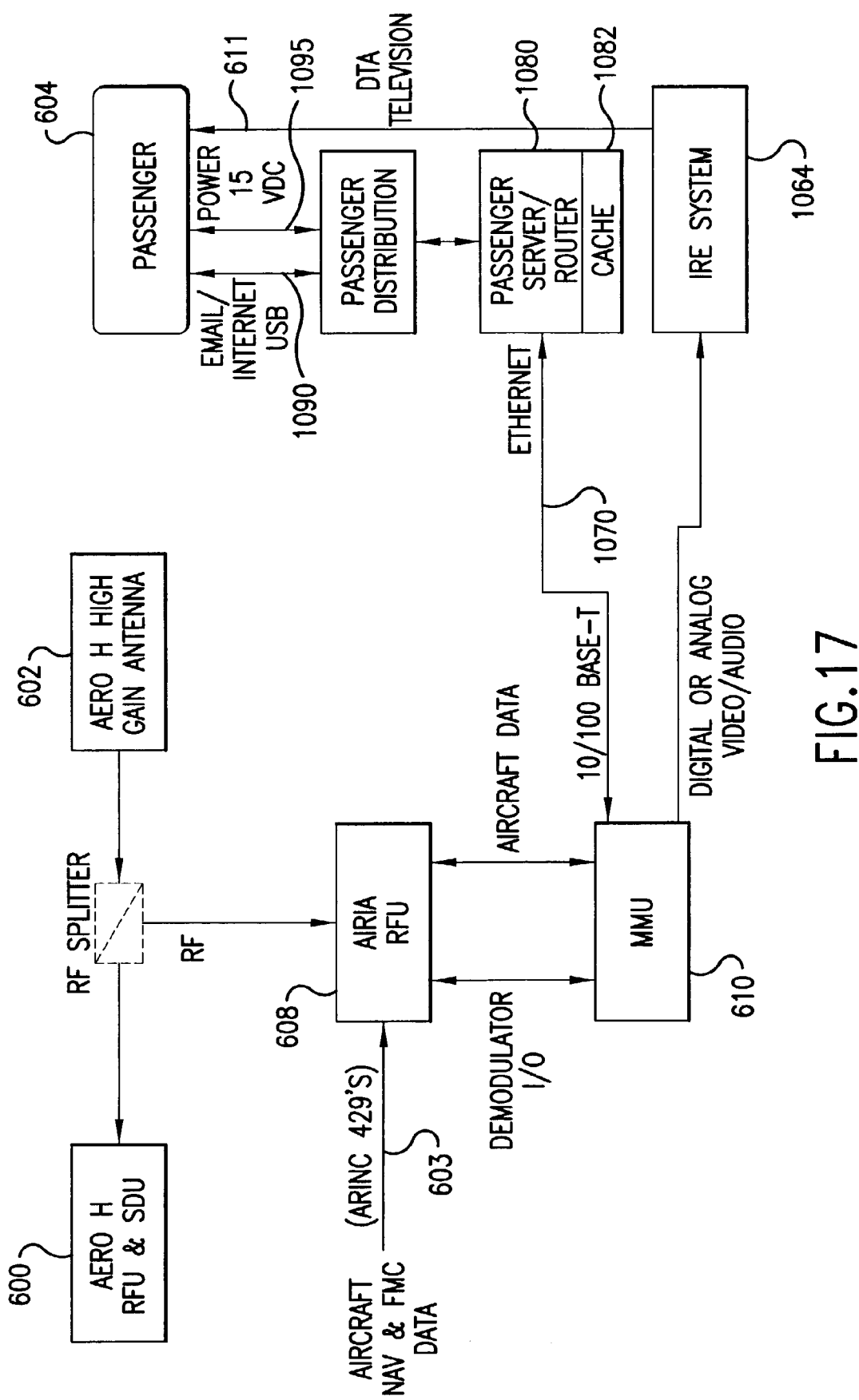
FIG. 17 illustrates the system operations control logic layer, in an exemplary embodiment of the present invention.

FIG. 17 illustrates the system operation control logic layer 901 in accordance with the invention. FIG. 17 illustrates the flow of data from the mobile platform component 1062 control functions 15a and 15b, to the NOC Operator control function 14 and the Workflow Manager function 13. The system operation control logic layer 901 serves as the system management element. The mobile platform component 1062 autonomously monitors and controls itself. A manual interface allows the flight crew to start and stop the mobile platform component 1062. The mobile platform component 1062 also gathers statistical performance data and error messages and communicates them to the Ground Segment 102 at the NOC 1020. The Ground Segment 102 includes a NOC operator control function that monitors and controls the real-time video processing streams, and a workflow manager function that provides processing rules and individual item status to the ancillary Ground Segment functions of Inter-flight scheduling, Offline Video Processing, Transport Scheduler, and the Order Entry System interface.

The mobile platform component 1062 control system is composed of an automatic monitoring control function 15a with a manual aircraft cabin interface (not numbered), and a remote system control function 15b that forwards log messages (event-driven) to the NOC 1020. The automatic monitoring control function 15a receives status information from mobile platform 1062 components (receivers, decompression/playback function, digital DEMUX), interprets the status, and provides (as required) corrective instructions to the components. An example of a corrective instruction would be the rerouting of an incoming stream of data from an inoperative receiver, to another.

The remote system control function 15b logs failures, thresholds, and pending events (incomplete events) in a file for analysis. The onboard software analyzes the results of the logged data and communicates it to the NOC 1020. The manual cabin systems control interface allows the flight crew to start and stop the mobile platform component 1062 as necessary.

The NOC Operator control function 14 monitors the back-end processes that support the delivery of live video and audio. This includes the Broadcast Management function 1 of FIG. 8 of importing content, the real-time capture and compression function 5 of FIG. 8A of the content, and the multiplexing of the video/audio streams. NOC Operator control function 14 monitors the operational ground segment 102 hardware systems. Each addressable hardware device provides status information to a master console where an operator can remotely control the devices. Actions to perform during live streaming broadcasts include starting the process, stopping the broadcast and overriding the broadcast with pre-recorded content. In a similar manner, the NOC Operator control function 14 monitors Earth Station 1022's transmit system to verify and control the system-unique transmission software. A round trip view of compression-to-display enables the operator to watch an on-ground simulcast. The NOC Operator Control function 14 receives status messages from an airborne system control component (not shown). Corrective instructions are issued (as required) through the Data Transport logic layer of FIG. 8A.

The overall system 100 includes a background workflow for incoming video inserts (such as an advertisement) that will be distributed to mobile platforms such as an aircraft. This workflow applies to video inserts that are scheduled for local storage on an aircraft, rather than to the live (real-time) streams that are generated by the on-line video compression systems. The workflow incorporates all tasks that may be undertaken regarding the video insert, including the following:

A record must be created for each video insert to be processed by the overall system 100.

Space must be reserved for the video insert.

A contract must be created and recorded. [Note: A contract may incorporate several inserts/advertisements.]

The contract may require several steps prior to final acceptance (the Airia salesperson drafts the contract, the client signs the contract, the Airia sales manager approves the contract).

A tape or file must arrive and be linked to the video insert record.

The tape or file must be captured to digital media and compressed.

Quality control personnel or sales management must approve the resulting compressed file.

The file must be released for distribution.

The file must be distributed to aircraft.

If a problem is identified after the file is distributed to aircraft, it must be possible to put the file on "hold" until the problem is resolved.

If necessary, it must be possible to mark a file as "bad" within our system and to trigger the deletion of the file on all aircraft.

The workflow manager function 13 of FIG. 17 manages the data associated with the workflow described above and enforces business rules regarding the workflow. As each step is performed within the workflow, data records are added or changed to reflect the action. The data is stored and managed within a single component, simplifying report generation and status accounting of individual advertisements or files.

Other components of the overall system 100 communicate with the workflow manager function 13 to determine what tasks must be performed and to enter information regarding tasks that have been completed. Actual task execution is performed by other components. For example, scheduling of advertisements is carried out by the Ground Scheduling system (not shown).

The variations to which the predictive video segment insertion schedule may be subject to within the inter-flight and/or intra-flight scheduling processes described above indicate that a significant variety of triggers may be used in order to initiate the insertion of customized content into received broadcast streams. Accordingly, this provides a myriad of scenarios and applications to which the method and apparatus in accordance with the invention are applicable.

For example, a passenger, when making a travel reservation, could, in addition to requesting a specialized meal, also request specific audio/video content he/she would like to enjoy. The specifically requested audio/video content could then be loaded to the mobile segment prior to departure (or during the trip). Similarly, live content, such as an ongoing concert or sporting event such as the World Series could be displayed on the mobile segment, either with or without a delay.

Even in scenarios where customized content requests are not permitted, each user may be able to customize and/or prioritize his/her schedule for play back of the available content. For example, each passenger could individually schedule the available content around his/her individual work/sleep/viewing time schedule so that each passenger can view the available content at a point in the trip, which is most convenient for them.

Another example of the utility of the present invention is a user can buffer audio/video to account for cabin interruptions and/or bathroom breaks. Further with respect to the embodiments to be explained, and as illustrated in FIGS. 18 and 19, the present invention also permits a passenger to buy goods (such as duty-free goods) via interactive advertisements.

The invention being thus described, it will be obvious that the same may be varied in many ways. For example, non-video data can be multiplexed with the entertainment content. This auxiliary data can be demultiplexed on the aircraft by the MMU 610 and delivered to external devices to support other applications or data services, such as E-mail and electronic weather maps, as is to be further explained below.

Figure 18:
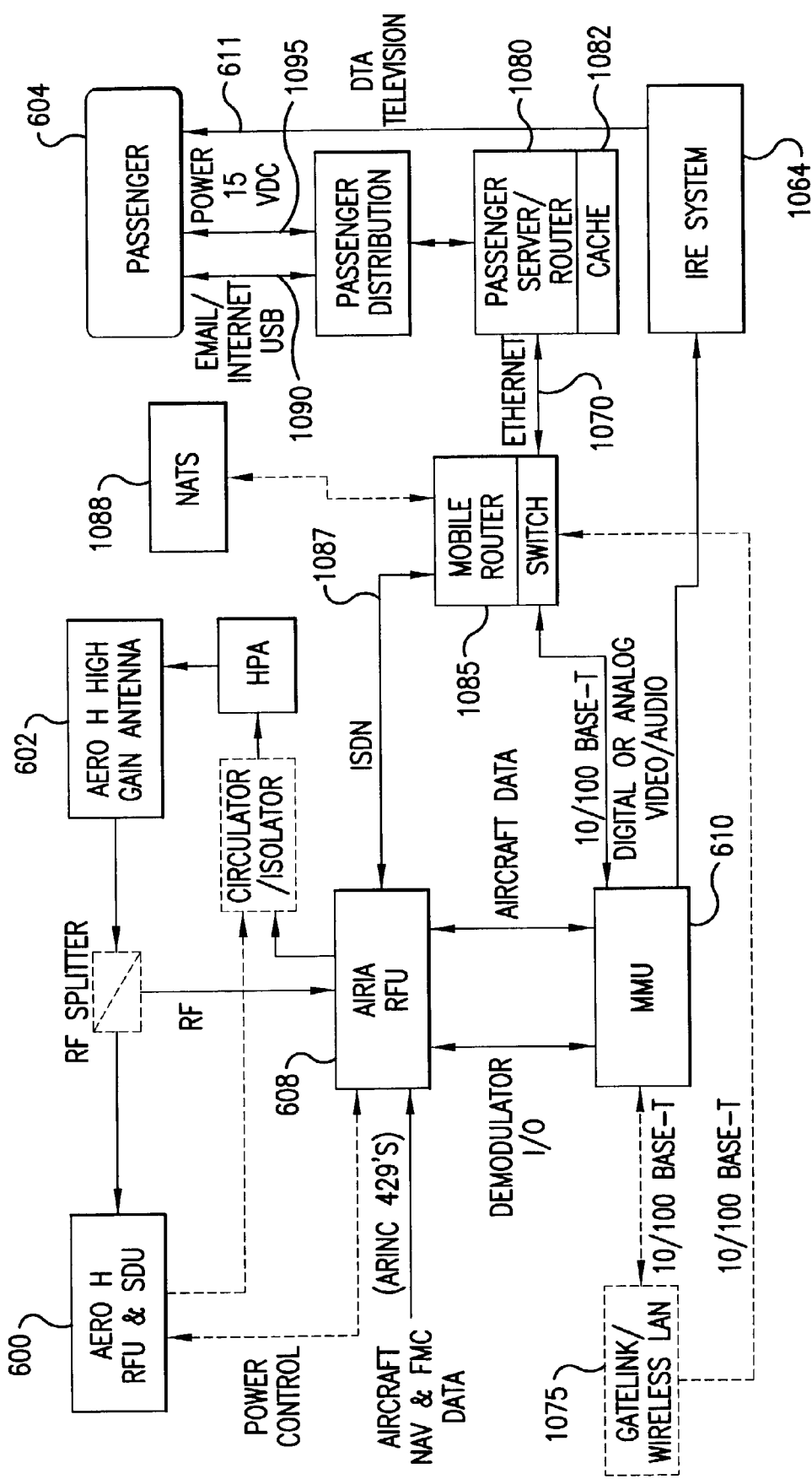
FIG. 18 illustrates the overall system in another exemplary embodiment of the present invention.
Figure 19:
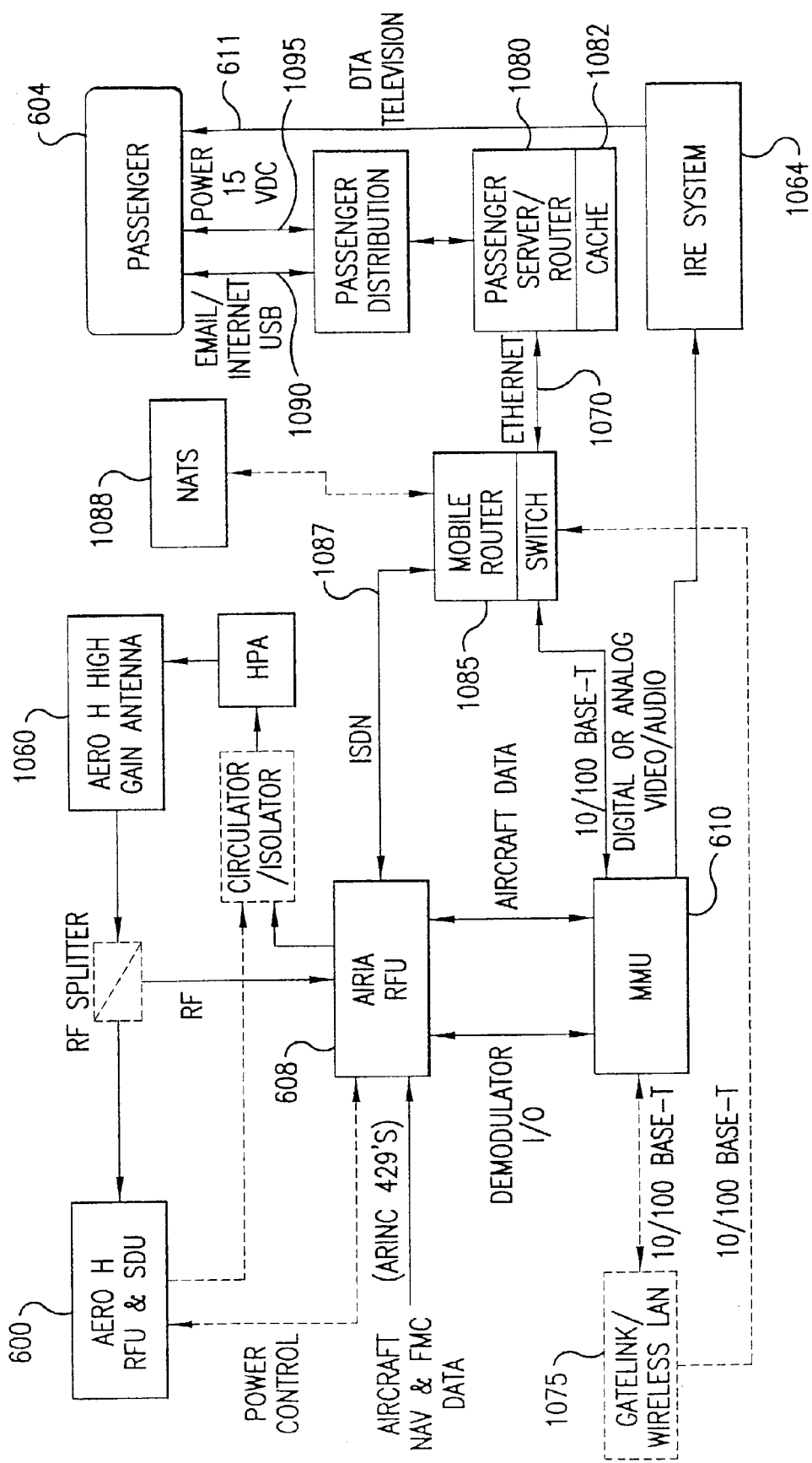
FIG. 19 illustrates the overall system in a further exemplary embodiment of the present invention.

FIGS. 18 and 19 illustrate the overall system in another exemplary embodiment of the present invention. Although the embodiments of FIGS. 1–7 have been described as providing audio/video information, the system 100 of the present invention may also provide other data services, as illustrated in FIGS. 18 and 19.

FIG. 18 illustrates an arrangement where the MMU 610 provides analog video/audio data to the IRE system 1064 and also supplies e-mail or web-related data via Ethernet 1070 to a passenger server/router 1080. For example, received data that is destined for an external device (such as an E-mail server) is sent out from the MMU 610 via Ethernet 1070. The passenger server/router 1080 includes cache 1082 for storing the e-mail and web-related data received over Ethernet 1070. The passenger server/router 1080 provides the e-mail/web-related data via passenger distribution system 604 to each individual passenger. The passenger distribution may provide the e-mail/internet related information via a USB port 1090 and also provide power (at 1095) to the passenger station.

FIG. 19 illustrates an arrangement where the IRE system 1064 provides bidirectional internet services. FIG. 19 includes many of the same elements as illustrated in FIG. 18 and the description thereof will not be repeated here. The MMU 610 receives the full internet/email services via a gatelink/wireless LAN 1075, which provides 110/100 base-T signals to the MMU 610 and to a mobile router/switch 1085. The MMU 610 passes 110/100 base-T signals to the mobile router/switch 1085, and mobile router/switch 1085 also includes an ISDN line 1087 to the RFU 608.

The mobile router/switch 1085 may also have an interface (not shown) to a telephone system, such as the North American Telephone System (NATS) 1088 to provide voice communication to the passenger. The mobile router/switch 1085 is connected to the passenger server/router 1080 via Ethernet 1070. Using the passenger server/router 1080 and passenger distribution system 604, the passenger may receive full real time bi-directional internet/e-mail communication at the airline seat. In addition to offering bi-directional internet services, the system as embodied in FIG. 19 also may provide a combination of services including audio/video, bi-directional internet, and voice communications. Further, the MMU 610 in FIGS. 18 and 19 may also act as an information server for forwarding e-mail, web cache, financial news, sports scores, and a synthetic channel such as Bizjet.

The above-described method and apparatus has been described as comprised of several components, flowcharts or blocks, it should be understood that the method may be implemented in application specific integrated circuits, software-driven processor circuitry, or other arrangements of discrete components. For example, although RFU 608 and MMU 610 have been described as discrete components, they may be embodied in a single structure in which the respective units share the same hardware circuitry. Such variations are not to be regarded as a departure from the spirit and scope of the invention, and all such modifications as would be obvious to one skilled in the art are intended to be included within the scope of the following claims.

What is claimed is:

1. An apparatus for generating customized content for in-route communication services on a mobile element, comprising:

an input for inputting a primary content portion intended for a plurality of mobile elements, a supplemental content portion including supplemental content, an initial schedule portion, and a plurality of markers indicating where the supplemental content portion may be inserted, wherein said initial schedule portion indicates a preliminary schedule for inserting supplemental content into said primary content portion based on a transit schedule for a particular mobile element;

an intra-transit scheduler for refining said initial schedule portion to generate an updated insertion schedule for inserting supplemental content into said primary content portion based on changes to the transit schedule for said particular mobile element; and a customizing unit, which inserts supplemental content into said primary content portion at markers in accordance with said updated insertion schedule to generate a customized communications stream for output to at least one user of said particular mobile element.

2. The apparatus of claim 1, wherein said schedule portion is based on a predetermined transit and broadcast schedule for said particular mobile element.

3. The apparatus of claim 2, wherein said intra-transit scheduler refines said schedule portion based on changes to said predetermined transit and broadcast schedule.

4. The apparatus of claim 3, wherein said changes include program changes and transit delays.

5. The apparatus of claim 1, wherein said input is located at one of a mobile element or a fixed site.

6. The apparatus of claim 1, further comprising: a converter to convert an input communications stream into an audiovisual signal provided to a distribution system for output to said user.

7. The apparatus of claim 1, further comprising: a converter to convert an input communication stream into machine readable data traffic to route to a distribution system for output to ancillary data communication equipment.

8. The apparatus of claim 1, wherein said supplemental content portion includes at least one of customized advertisement information, graphic overlays, text streams, and branding segments.

9. The apparatus of claim 1, wherein said supplemental content portion includes data traffic intended for ancillary onboard data communication equipment.

10. The apparatus of claim 1, wherein said input receives a communications stream using a public communications network.

11. The apparatus of claim 1, wherein said markers further indicate where content has been deleted for insertion of said supplement content portion.

12. The apparatus of claim 11, wherein said deleted content includes advertising information intended for another one of said plurality of mobile elements.

13. The apparatus of claim 1, wherein said customized communications stream is generated in accordance with predetermined user preferences.

14. The apparatus of claim 1, wherein said one of a plurality of mobile elements is an aircraft.

15. A method for generating customized content for in-route communication services on a mobile element, comprising:

inputting a primary content portion intended for a plurality of mobile elements, a supplemental content portion including supplemental content, an initial schedule portion, and a plurality of markers indicating where the supplemental content portion may be inserted, wherein said initial schedule portion indicates a preliminary schedule for inserting supplemental content into said primary content portion based on a transit schedule for a particular mobile element;

refining said initial schedule portion to generate an updated insertion schedule for inserting supplemental content into said primary content portion based on changes to the transit schedule for said particular mobile element; and inserting supplemental content into said primary content portion at markers in accordance with said updated insertion schedule to generate a customized communications stream for output to at least one user of said particular mobile element.

16. The method of claim 15, wherein said schedule portion is based on a predetermined transit and broadcast schedule for said one of a plurality of mobile elements.

17. The method of claim 15, further comprising:
converting the input of said inputting step into a audio-visual signal provided to a distribution system for output to said user.

18. The method of claim 15, wherein said supplemental content portion includes at least one of customized advertisement information, graphic overlays, text streams, and branding segments.

* * * * *